(12) United States Patent
Kubo

(10) Patent No.: US 9,794,437 B2
(45) Date of Patent: Oct. 17, 2017

(54) INFORMATION PROCESSING APPARATUS, INFORMATION PROCESSING SYSTEM, AND INFORMATION PROCESSING METHOD

(71) Applicant: Naohiko Kubo, Kanagawa (JP)

(72) Inventor: Naohiko Kubo, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 1 day.

(21) Appl. No.: 14/988,125

(22) Filed: Jan. 5, 2016

(65) Prior Publication Data

US 2016/0198055 A1  Jul. 7, 2016

(30) Foreign Application Priority Data

Jan. 6, 2015 (JP) ................................. 2015-001003
Dec. 25, 2015 (JP) ................................. 2015-255351

(51) Int. Cl.
*H04N 1/00* (2006.01)
*H04N 1/32* (2006.01)

(52) U.S. Cl.
CPC ..... *H04N 1/00493* (2013.01); *H04N 1/00474* (2013.01); *H04N 1/00925* (2013.01); *H04N 1/32101* (2013.01); *H04N 2201/0075* (2013.01); *H04N 2201/0094* (2013.01)

(58) Field of Classification Search
CPC .................................................. H04N 1/00493
See application file for complete search history.

(56) References Cited

U.S. PATENT DOCUMENTS 5,699,494 A * 12/1997 Colbert ................. G06F 3/1293
                                                        358/1.13
2010/0302586 A1   12/2010 Takahashi et al.
2013/0194628 A1 *  8/2013 Kamimoto ............ G06F 3/1286
                                                        358/1.15

FOREIGN PATENT DOCUMENTS

JP         4900422       1/2012
JP         2013-157860   8/2013

* cited by examiner

*Primary Examiner* — Ibrahim Siddo
(74) *Attorney, Agent, or Firm* — Harness, Dickey & Pierce, P.L.C.

(57) ABSTRACT

An information processing apparatus according to an aspect of the present invention includes a display unit, a storage unit, an accepting unit, and an association control unit. The accepting unit accepts an operation. The association control unit performs control of associating operation information indicating the operation accepted by the accepting unit and an image of a region, which corresponds to the operation accepted by the accepting unit, on a screen displayed on the display unit into an associated set and storing the associated set in the storage unit.

20 Claims, 20 Drawing Sheets

FIG.7

| ORDER INFOR-MATION | OPERATION INFORMATION | | IMAGE ID |
|---|---|---|---|
| | TYPE INFORMATION | PERTINENT INFORMATION | |
| 1 | Click | --- | Aaa.png |
| 2 | Flick | Angle (direction) of flick: 60° | Bbb.png |
| 3 | Click | --- | Ccc.png |
| 4 | Long Press | Long press duration: 2,000 msec | Ddd.png |
| 5 | Flick | Angle (direction) of flick: 270° | Eee.png |
| 6 | Click | --- | Fff.png |

IMAGE READ OUT FROM FILE
"Aaa.png"

FIG.15

| ORDER INFOR-MATION | OPERATION INFORMATION ||  IMAGE ID | BUTTON ID |
|---|---|---|---|---|
| | TYPE INFOR-MATION | PERTINENT INFORMATION | | |
| 1 | Click | --- | AAA.png | MenuKey |
| 2 | Flick | Angle (direction) of flick: 60° | BBB.png | Page1 |
| 3 | Click | --- | CCC.png | ZoomIn |
| 4 | Long Press | Long press duration: 2,000 msec | DDD.png | ZoomOut |
| 5 | Flick | Angle (direction) of flick: 270° | EEE.png | Page2 |
| 6 | Click | --- | FFF.png | Print |

FIG.17
| BUTTON IMAGE |  Printer |  Scanner |
|---|---|---|
| BUTTON ID | Print | (NOT ASSIGNED) |
| KEY-TOP CHARACTER STRING | "Printer" | "Scanner" |
| PROCESS TO BE PERFORMED WHEN BUTTON IS CLICKED | START PRINTER App | START SCANNER App |
610 → Printer
620 → Scanner
FIG.18
| ORDER INFOR- MATION | OPERATION INFORMATION | | IMAGE ID | BUTTON ID |
| | TYPE INFOR- MATION | PERTINENT INFORMATION | | |
|---|---|---|---|---|
| 1 | Click | --- | AAA.png | Print |
| 2 | Flick | --- | BBB.png | Scanner |

FIG.20

| ORDER INFOR-MATION | OPERATION INFORMATION | | IMAGE ID | BUTTON ID |
|---|---|---|---|---|
| | TYPE INFOR-MATION | PERTINENT INFORMATION | | |
| 1 | Click | --- | AAA.png | MenuKey |
| 2 | Flick | Angle (direction) of flick: 60° | BBB.png | Page1 |
| 3 | Click | --- | CCC.png | ZoomIn |
| 4 | Long Press | Long press duration: 2,000 msec | DDD.png | ZoomOut |
| 5 | Flick | Angle (direction) of flick: 270° | EEE.png | Page2 |
| 6 | Click | --- | GGG.png | Print |

FIG.21

| ORDER INFOR-MATION | OPERATION INFORMATION | | IMAGE ID | BUTTON ID | TYPE NUMBER |
|---|---|---|---|---|---|
| | TYPE INFOR-MATION | PERTINENT INFORMATION | | | |
| 1 | Click | --- | AAA.png | MenuKey | System Modification |
| 2 | Flick | Angle (direction) of flick: 60° | BBB.png | Page1 | Screen Manipulation |
| 3 | Click | --- | CCC.png | ZoomIn | Screen Manipulation |
| 4 | Long Press | Long press duration: 2,000 msec | DDD.png | ZoomOut | Screen Manipulation |
| 5 | Flick | Angle (direction) of flick: 270° | EEE.png | Page2 | Screen Manipulation |
| 6 | Click | --- | FFF.png | Print | Job Execution |

FIG.24A

| ADMINISTRATOR AUTHENTICATION SETTING | AUTHENTICATION: REQUIRED |
|---|---|
| USER AUTHENTICATION SETTING | AUTHENTICATION: REQUIRED |
| ADMINISTRATOR'S PASSWORD | XYZ |
| TYPE OF PAPER IN TRAY 1 | PLAIN PAPER |
| ... | ... |

FIG.24B

| ADMINISTRATOR AUTHENTICATION SETTING | AUTHENTICATION: NOT REQUIRED |
|---|---|
| USER AUTHENTICATION SETTING | AUTHENTICATION: REQUIRED |
| ADMINISTRATOR'S PASSWORD | NOT SET |
| TYPE OF PAPER IN TRAY 1 | PLAIN PAPER |
| ... | ... |

# INFORMATION PROCESSING APPARATUS, INFORMATION PROCESSING SYSTEM, AND INFORMATION PROCESSING METHOD

CROSS-REFERENCE TO RELATED APPLICATIONS

The present application claims priority to and incorporates by reference the entire contents of Japanese Patent Application No. 2015-001003 filed in Japan on Jan. 6, 2015 and Japanese Patent Application No. 2015-255351 filed in Japan on Dec. 25, 2015.

BACKGROUND OF THE INVENTION

1. Field of the Invention

The present invention relates generally to information processing apparatuses, information processing systems, and information processing methods.

2. Description of the Related Art

In recent years, as functions of information processing apparatuses extend, operations involved in setting the functions become complicated. To make full use of such an information processing apparatus, a user is required to have a thorough knowledge of functions and setting operations of the information processing apparatus. However, it is often the case that a user unfamiliar with information processing apparatuses deletes setting information by mistake or causes an error by applying inappropriate settings. To avoid such a problem, for example, a method, by which a support staff providing supports for the operations can operate an information processing apparatus from a remote terminal (i.e., a terminal operated by the support staff), and a method, by which a support staff can cause a user of an information processing apparatus to operate the information processing apparatus under instructions of the support staff, are known.

A technique that enables, even if a user of an information processing apparatus cannot remember or does not understand such a supported operation, the user to repeat the operation without requiring a support from the same or another support staff. For example, Japanese Patent No. 4900422 (Patent Document 1) discloses a technique including storing content communicated between a support terminal of a support staff providing support for operations of an image forming apparatus and the image forming apparatus as movie data in storage means, storing conversation carried out between the support staff and a user of the image forming apparatus as audio data associated with the movie data in the storage means, and playing back the stored movie data and the audio data when requested by the user.

However, the technique disclosed in Patent Document 1 is disadvantageous in that an amount of data to be stored is large because the technique involves recording and storing movie data and audio data, which are generally large in data size.

Therefore, there is a need for a technique for reducing an amount of data involved in replicating an operation.

SUMMARY OF THE INVENTION

It is an object of the present invention to at least partially solve the problems in the conventional technology.

According to exemplary embodiments of the present invention, there is provided an information processing apparatus comprising: a display unit; a storage unit; an accepting unit configured to accept an operation; and an association control unit configured to perform control of associating operation information indicating the operation accepted by the accepting unit and an image of a region on a screen displayed on the display unit, the region corresponding to the operation accepted by the accepting unit, into an associated set and storing the associated set in the storage unit.

Exemplary embodiments of the present invention also provide an information processing system comprising: an information processing apparatus including a display unit; and a terminal connectable to the information processing apparatus, the terminal including an emulated-screen display unit configured to display an emulated screen emulating at least a screen displayed on the display unit and a first-input-information transmitting unit configured to transmit first input information indicating an input entered into the emulated screen to the information processing apparatus, the information processing apparatus further including a storage unit, an accepting unit configured to accept any one of an operation based on the first input information and an operation based on second input information indicating an input entered into the screen displayed on the display unit, and an association control unit configured to perform control of associating operation information indicating the operation accepted by the accepting unit and an image of a region on the screen displayed on the display unit, the region corresponding to the operation accepted by the accepting unit, into an associated set and storing the associated set in the storage unit.

Exemplary embodiments of the present invention also provide an information processing method comprising: accepting an operation; and performing association control of associating operation information indicating the operation accepted at the accepting and an image of a region on a screen displayed on a display unit, the region corresponding to the operation accepted at the accepting, into an associated set and storing the associated set in a storage unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 7 is a diagram illustrating an example of association information;

FIG. 15 is a diagram illustrating an example of association information;

FIG. 17 is a diagram illustrating an example of button information;

FIG. 18 is a diagram illustrating an example of association information of a first modification;

FIG. 20 is a diagram illustrating an example of association information of the second modification;

FIG. 21 is a diagram illustrating an example of association information of a third modification;

FIGS. 24A and 24B are diagrams each illustrating an example of a setting list table.

DETAILED DESCRIPTION OF THE PREFERRED EMBODIMENTS

Exemplary embodiments of the present invention are described in detail below with reference to the accompanying drawings. Although an MFP (multifunction peripheral), which is one form of an image processing apparatus, is described below as an example of an information processing apparatus, to which the present invention is applied, application of the present invention is not limited thereto. The MFP is an apparatus having a plurality of different functions such as a copier function, a scanner function, a printer function, and a facsimile function.

First Embodiment

Figure 1:
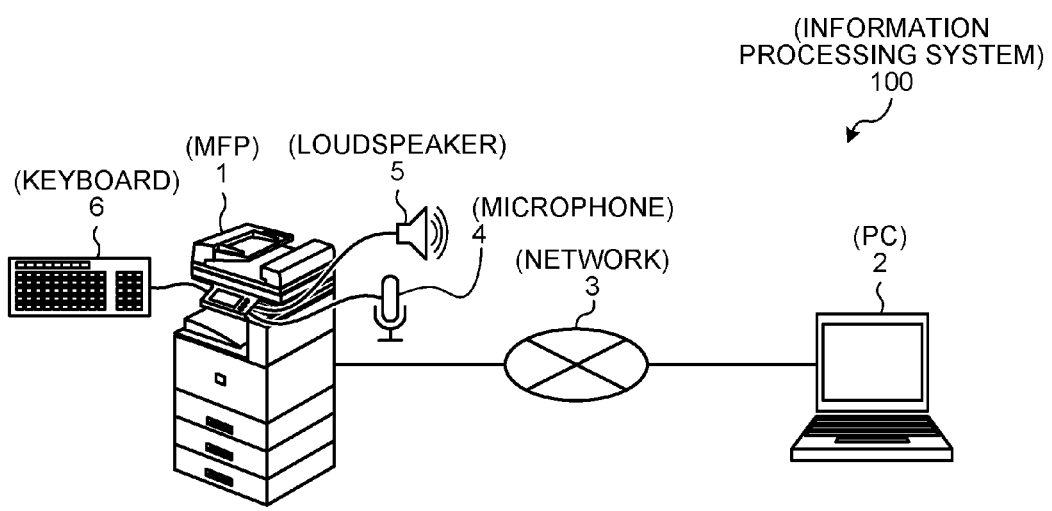
FIG. 1 is a diagram illustrating an example of a configuration of an information processing system.

FIG. 1 is a diagram illustrating an example of a configuration of an information processing system 100 according to a first embodiment. As illustrated in FIG. 1, the information processing system 100 includes an MFP 1 and a PC (personal computer) 2, which are mutually connectable via a network 3 such as the Internet. The MFP 1 of the first embodiment is configured such that a hardware device(s) such as a microphone 4, a loudspeaker 5, and a keyboard 6 (hereinafter, sometimes collectively referred to as "hardware device 7") is removably attachable to the MFP 1.

Figure 2:
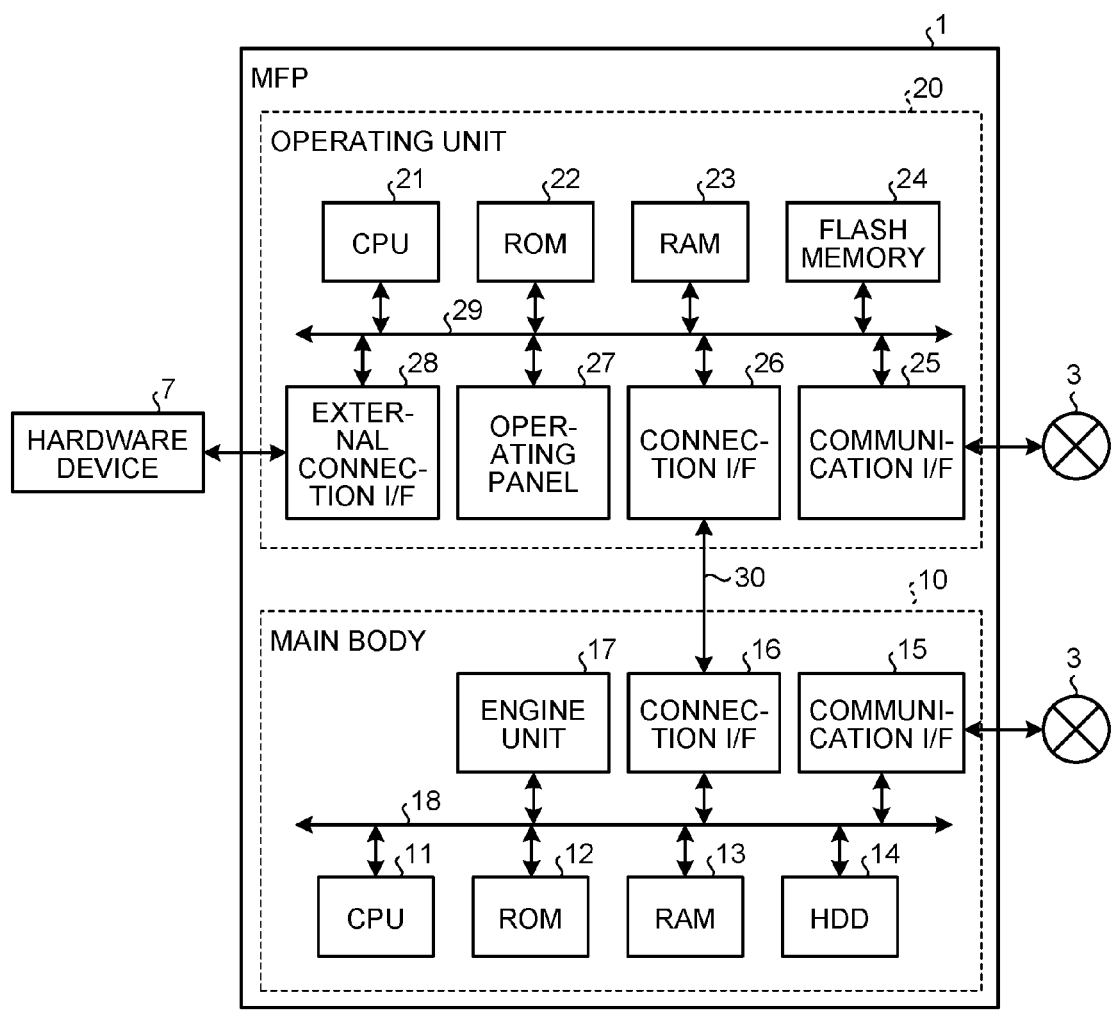
FIG. 2 is a diagram illustrating an example of a hardware structure of an MFP.

A hardware structure of the MFP 1 is described below with reference to FIG. 2. As illustrated in FIG. 2, the MFP 1 includes a main body 10 capable of implementing various functions including a copier function, a scanner function, a facsimile function, and a printer function and an operating unit 20 for accepting user's operation. Note that "accepting user's operation" denotes a concept including accepting information (including a signal representing screen coordinate values) entered according to user's operation. The main body 10 and the operating unit 20 are mutually communicably connected via a dedicated communication channel 30. A communication channel compliant to a USB (universal serial bus) standard, for example, can be used as the communication channel 30. Alternatively, a communication channel compliant to a desired standard, which may be either for wired or wireless communication, can be used as the communication channel 30.

The main body 10 can perform an operation, which depends on an operation accepted by the operating unit 20. Furthermore, the main body 10 is communicable with external equipment such as a client PC (personal computer) as well and can perform an operation according to an instruction received from the external equipment.

A hardware structure of the main body 10 is described below. As illustrated in FIG. 2, the main body 10 includes a CPU (central processing unit) 11, a ROM (read only memory) 12, a RAM (random access memory) 13, an HDD (hard disk drive) 14, a communication I/F (interface) 15, a connection I/F 16, and an engine unit 17, which are mutually connected via a system bus 18.

The CPU 11 exercises control over operations of the main body 10. The CPU 11 executes program instructions stored in the ROM 12, the HDD 14, or the like while using the RAM 13 as a work area to thereby control operations of the entire main body 10 and implement the above-described various functions including the copier function, the scanner function, the facsimile function, and the printer function.

The communication I/F 15 is an interface for connection with the network 3. The connection I/F 16 is an interface for communication with the operating unit 20 via the communication channel 30.

The engine unit 17 is hardware performing general information processing and processing, other than communication, for implementing the copier function, the scanner function, the facsimile function, and the printer function. For example, the engine unit 17 includes a scanner (image reading unit), which reads in an image of an original document by scanning the original document, a plotter (image forming unit), which performs printing on a sheet material such as paper, and a facsimile unit, which carries out facsimile communication. The engine unit 17 may further include an optional unit(s) such as a finisher for sorting printed sheets of sheet material and/or an ADF (automatic document feeder) for automatically feeding an original document.

A hardware structure of the operating unit 20 is described below. As illustrated in FIG. 2, the operating unit 20 includes a CPU 21, a ROM 22, a RAM 23, a flash memory 24, a communication I/F 25, a connection I/F 26, an operating panel 27, and an external connection I/F 28, which are mutually connected via a system bus 29.

The CPU 21 exercises control over operations of the operating unit 20. The CPU 21 executes program instructions stored in the ROM 22, the flash memory 24, or the like while using the RAM 23 as a work area to thereby control operations of the entire operating unit 20 and implement various functions, which are described later, including displaying information (image) in response to an input accepted from a user.

The communication I/F 25 is an interface for connection with the network 3. The connection I/F 26 is an interface for communication with the main body 10 via the communication channel 30.

The operating panel 27 accepts various inputs, each depending on user's operation, and displays a variety of information (e.g., information which depends on an accepted operation, information indicative of an operating status of the MFP 1, and information indicative of current settings). In this example, the operating panel 27 is implemented as an LCD (liquid crystal display) device having a function as a touch panel. However, the operating panel 27 is not limited thereto. For example, the operating panel 27 may be implemented as an organic EL (electro-luminescent) display device having a touch panel function. The operating panel 27 may include, in addition to or in lieu of such a display device, an operating unit, such as a hardware key, and/or an indicator, such as a lamp.

The external communication I/F 28 is an interface for connection with the hardware device 7. As described above, the hardware device 7 may be, for example, the microphone 4, the loudspeaker 5, and the keyboard 6.

Figure 3:
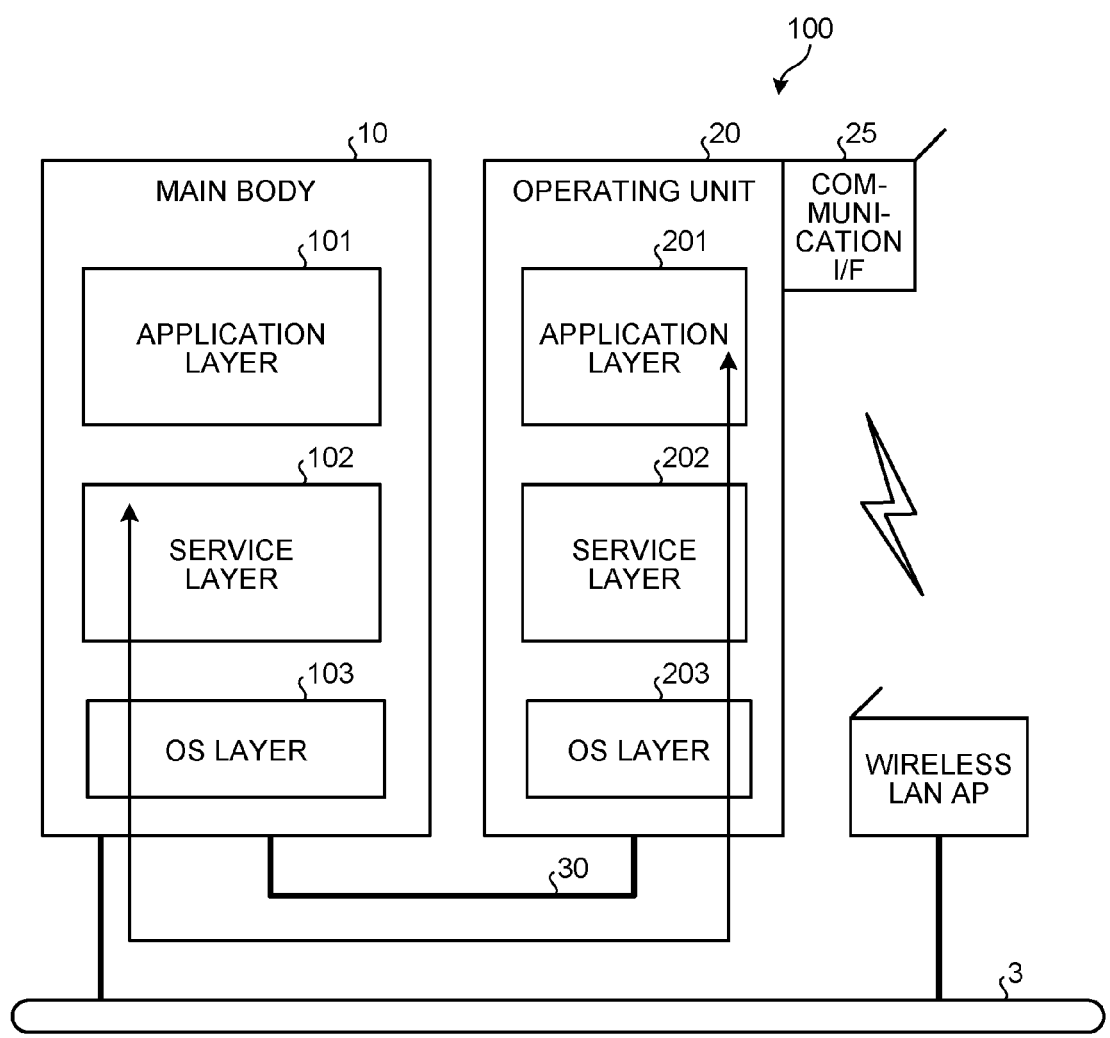
FIG. 3 is a diagram illustrating an example of a software configuration of the MFP.

A software configuration of the MFP 1 is described below. FIG. 3 is a diagram illustrating an example of the software configuration of the MFP 1. As illustrated in FIG. 3, the main body 10 includes an application layer 101, a service layer 102, and an OS (operating system) layer 103. The application layer 101, the service layer 102, and the OS layer 103 are implemented in a variety of software stored in the ROM 12, the HDD 14, or the like. The CPU 11 executes the software, thereby providing the various functions.

The software of the application layer 101 is application software (hereinafter, sometimes simplified as "App") for providing predetermined functions by causing hardware resources to work. Examples of the App include a copier App providing the copier function, a scanner App providing the scanner function, a facsimile App providing the facsimile function, and a printer App providing the printer function.

The software of the service layer 102 is software for providing an interface, interposed between the application layer 101 and the OS layer 103, for enabling Apps to utilize the hardware resources included in the main body 10. More specifically, the software of the service layer 102 provides a function of accepting operation requests each requesting for an operation using the hardware resources and a function of arbitrating the operation requests. Examples of the operation request that may possibly be accepted by the service layer 102 include a request requesting for reading using the scanner and a request requesting for printing using the plotter.

The service layer 102 provides the interface function not only to the application layer 101 of the main body 10 but also to an application layer 201 of the operating unit 20. Accordingly, the application layer 201 of the operating unit 20 can implement functions utilizing the hardware resources (e.g., the engine unit 17) of the main body 10 via the interface function of the service layer 102.

The software of the OS layer 103 is basic software (OS (operating system)) providing basic functions for controlling the hardware included in the main body 10. The software of the service layer 102 converts each request requesting for utilizing a hardware resource(s) issued from the various Apps into a command interpretable by the OS layer 103 and passes the command to the OS layer 103. The software of the OS layer 103 executes the command. The hardware resources are thus caused to work as requested by the Apps.

Similarly, the operating unit 20 includes the application layer 201, a service layer 202, and an OS layer 203. The application layer 201, the service layer 202, and the OS layer 203 included in the operating unit 20 are similar to those of the main body 10 in hierarchal architecture. However, functions provided by Apps of the application layer 201 and types of operation requests acceptable by the service layer 202 differ from those of the main body 10. The Apps of the application layer 201 may be software for providing predetermined functions by causing the hardware resources included in the operating unit 20 to work. However, the Apps of the application layer 201 are mainly software for providing UI (user interface) functions for operations and display related to the functions (the copier function, the scanner function, the facsimile function, and the printer function) included in the main body 10. The Apps of the application layer 201 include a remote support App for providing remote support, which is a mode where the MFP 1 can accept an operation from the PC 2.

In the first embodiment, the software of the OS layer 103 of the main body 10 and the software of the OS layer 203 of the operating unit 20 differ from each other so that functional independence is maintained. More specifically, the main body 10 and the operating unit 20 run on separate operating systems independently of each other. For example, it is possible that the OS layer 103 of the main body 10 uses Linux (registered trademark) as the software, whereas the OS layer 203 of the operating unit 20 uses Android (registered trademark) as the software.

As described above, because the main body 10 and the operating unit 20 run on separate OSes, communication between the main body 10 and the operating unit 20 is carried out as communication between different apparatuses rather than communication between processes inside a single apparatus. Examples of the communication include an operation (i.e., command communication) of transmitting information (i.e., what instruction is given by a user) accepted by the operating unit 20 to the main body 10 and an operation of transmitting a notice of an event from the main body 10 to the operating unit 20. The operating unit 20 can use the functions of the main body 10 by carrying out the command communication with the main body 10. Examples of the event, notice of which is transmitted from the main body 10 to the operating unit 20, include a status of an operation being performed by the main body 10 and settings applied by the main body 10.

In the first embodiment, because electric power is supplied from the main body 10 to the operating unit 20 via the communication channel 30, power supply to the operating unit 20 can be controlled separately from (independently of) power supply control of the main body 10.

Figure 4:
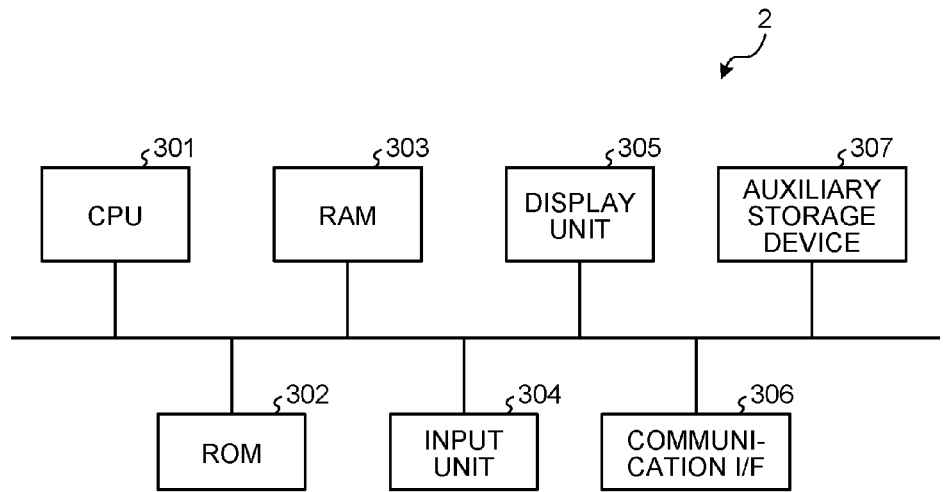
FIG. 4 is a diagram illustrating an example of a hardware structure of a PC.

A hardware structure of the PC 2 is described below. FIG. 4 is a diagram illustrating an example of the hardware structure of the PC 2. As illustrated in FIG. 4, the PC 2 includes a CPU 301, a ROM 302, a RAM 303, an input unit 304, a display unit 305, a communication I/F 306, and an auxiliary storage device 307. The CPU 301 exercises control over operations of the PC 2. The ROM 302 is a non-volatile memory storing therein various data such as program instructions. The RAM 303 is a volatile memory functioning as a work area for various processing executed by the CPU 301. The input unit 304 is a device to be used by a user in entering an operation and implemented as a mouse and a keyboard, for example. The display unit 305 is a device displaying a variety of information and implemented as a liquid crystal display device, for example. The communication I/F 306 is an interface for connection with the network 3. The auxiliary storage device 307 is implemented as an HDD or an NVRAM (non-volatile random access memory), for example.

Although the stationary PC 2 is employed as an example of a terminal connectable to the MFP 1 in this example, the terminal is not limited thereto. Alternatively, a portable terminal such as a smartphone or a tablet PC may be employed. In short, the terminal (i.e., the terminal included in the information processing system 100) may be of any type.

Figure 5:
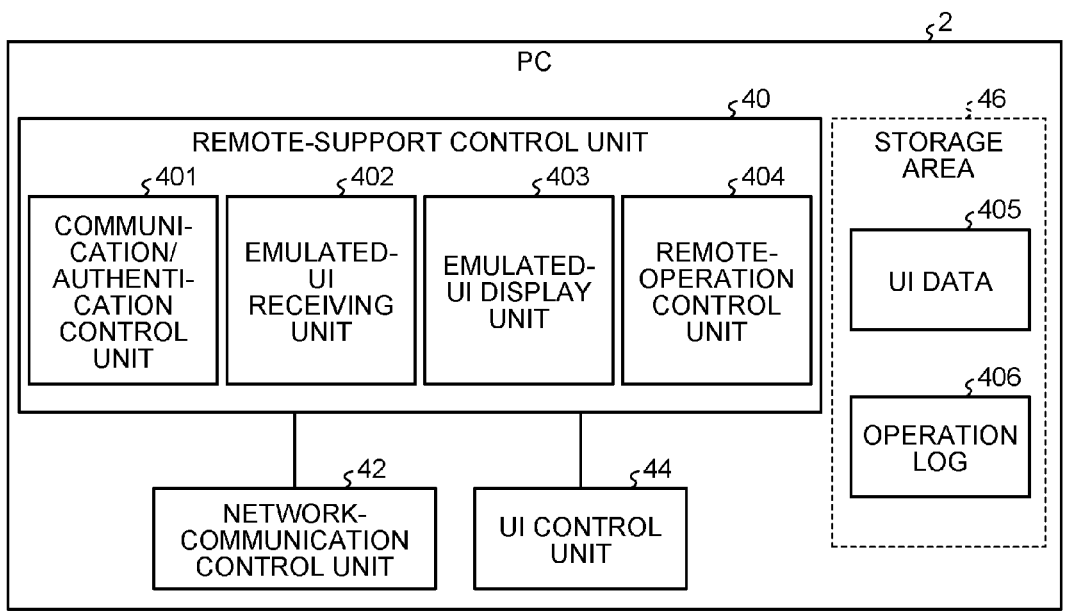
FIG. 5 is a diagram illustrating an example of functions included in the PC.

Functions included in the PC 2 are described below. FIG. 5 is a diagram illustrating an example of the functions included in the PC 2. Although FIG. 5 mainly illustrates functions related to the present invention for convenience of description, functions included in the PC 2 are not limited thereto. As illustrated in FIG. 5, the PC 2 includes a remote-support control unit 40, a network-communication control unit 42, a UI control unit 44, and a storage area 46.

The remote-support control unit 40 includes a communication/authentication control unit 401, an emulated-UI receiving unit 402, an emulated-UI display unit 403, and a remote-operation control unit 404.

Upon receiving from the MFP 1 a connection request requesting for connection with the PC 2, the communication/authentication control unit 401 checks whether or not connection with the MFP 1 can be established, and establishes connection with the MFP 1 based on a result of the check where connection with the MFP 1 can be established. In the first embodiment, upon receiving a connection request from the MFP 1, the communication/authentication control unit 401 requests the MFP 1 for detailed function information indicating details (i.e., specifications of the MFP 1) of functions included in the MFP 1, and receives detailed function information from the MFP 1 as a response to the request. If the detailed function information received from the MFP 1 meets a predetermined condition (i.e., a condition for connection with the PC 2), the communication/authentication control unit 401 permits connection with the PC 2 and performs control for connecting between the MFP 1 and the PC 2.

Although the communication/authentication control unit 401 performs control for connecting between the MFP 1 and the PC 2 triggered by receipt of a connection request from the MFP 1 in this example, the trigger is not limited thereto. For example, a configuration, in which the communication/authentication control unit 401 performs control for connecting between the MFP 1 and the PC 2 triggered by an instruction from a user (hereinafter, sometimes referred to as "second user") of the PC 2. With this configuration, the communication/authentication control unit 401 may operate as follows, for example. The communication/authentication control unit 401 requests the MFP 1 designated by the second user for the above-described detailed function information and receives the detailed function information as a response to the request. If the detailed function information meets the predetermined condition, the communication/authentication control unit 401 permits connection with the PC 2 and performs control for establishing connection between the PC 2 and the MFP 1.

When connection between the PC 2 and the MFP 1 is established by the communication/authentication control unit 401, the emulated-UI receiving unit 402 requests the MFP 1 connected with the PC 2 for an emulated UI (an example of "emulated screen") emulating at least a screen displayed on the operating panel 27 (an example of "display unit") of the operating unit 20 of the MFP 1 and receives an emulated UI as a response to the request. The emulated UI may be configured to include information (image) emulating a hard key(s), which is additionally connected to the MFP 1, of the hardware device 7.

The emulated-UI display unit 403 is an example of "emulated-screen display unit" and displays the emulated UI. In the first embodiment, the emulated-UI display unit 403 performs control of displaying the emulated UI received by the emulated-UI receiving unit 402 on the display unit 305 of the PC 2.

The remote-operation control unit 404 is an example of "first-input-information transmitting unit" and transmits first input information indicating an input entered into the emulated UI displayed on the display unit 305 of the PC 2 to the MFP 1. In the first embodiment, when, during remote support, which is the mode where the MFP 1 and the PC 2 are mutually connected via the network 3 and the MFP 1 can accept an operation from the PC 2, an input entered into the emulated UI is accepted by the UI control unit 44, which is described later, the remote-operation control unit 404 performs control of transmitting the first input information indicating the accepted input to the MFP 1. In the first embodiment, the second user can specify a desired position by moving a cursor (pointer) displayed on the display unit 305 to the desired position by operating a mouse (an example of the input unit 304) and pressing a button of the mouse. However, the method for specifying a desired position is not limited thereto. In this example, the above-described first input information contains, but is not limited to, at least first starting point information indicating a starting point (in this example, a position where the second user starts pressing the mouse button) of a position specified by the second user on the emulated UI, time information indicating time (i.e., time when pressing the mouse button is started) corresponding to the first starting point information, first endpoint information indicating an endpoint (in this example, a position where the second user stops pressing the mouse button or, put another way, position where the second user releases his/her finger from the mouse button) of the position specified by the second user on the emulated UI, and time information indicating time (i.e., time when pressing the mouse button is stopped) corresponding to the first endpoint information.

The network-communication control unit 42 controls communications carried out via the network 3. More specifically, the network-communication control unit 42 transmits and receives data to and from the MFP 1 via the network 3. The UI control unit 44 accepts various inputs entered using a mouse, a keyboard, or the like. The storage area 46 is an area created in the auxiliary storage device 307, which may be an HDD, an NVRAM, or the like, to store therein a UI data (image data) 405 and an operation log 406.

In the first embodiment, functions of the above-described remote-support control unit 40 (the communication/authentication control unit 401, the emulated-UI receiving unit 402, the emulated-UI display unit 403, and the remote-operation control unit 404), the network-communication control unit 42, and the UI control unit 44 are implemented by the CPU 301 by executing program instructions stored in the ROM 302 or the like. However, the implementation is not limited thereto. For example, at least a part of the functions of the above-described units of the remote-support control unit 40, the network-communication control unit 42, and the UI control unit 44 may be implemented in dedicated hardware circuitry (e.g., a semiconductor integrated circuit).

Figure 6:
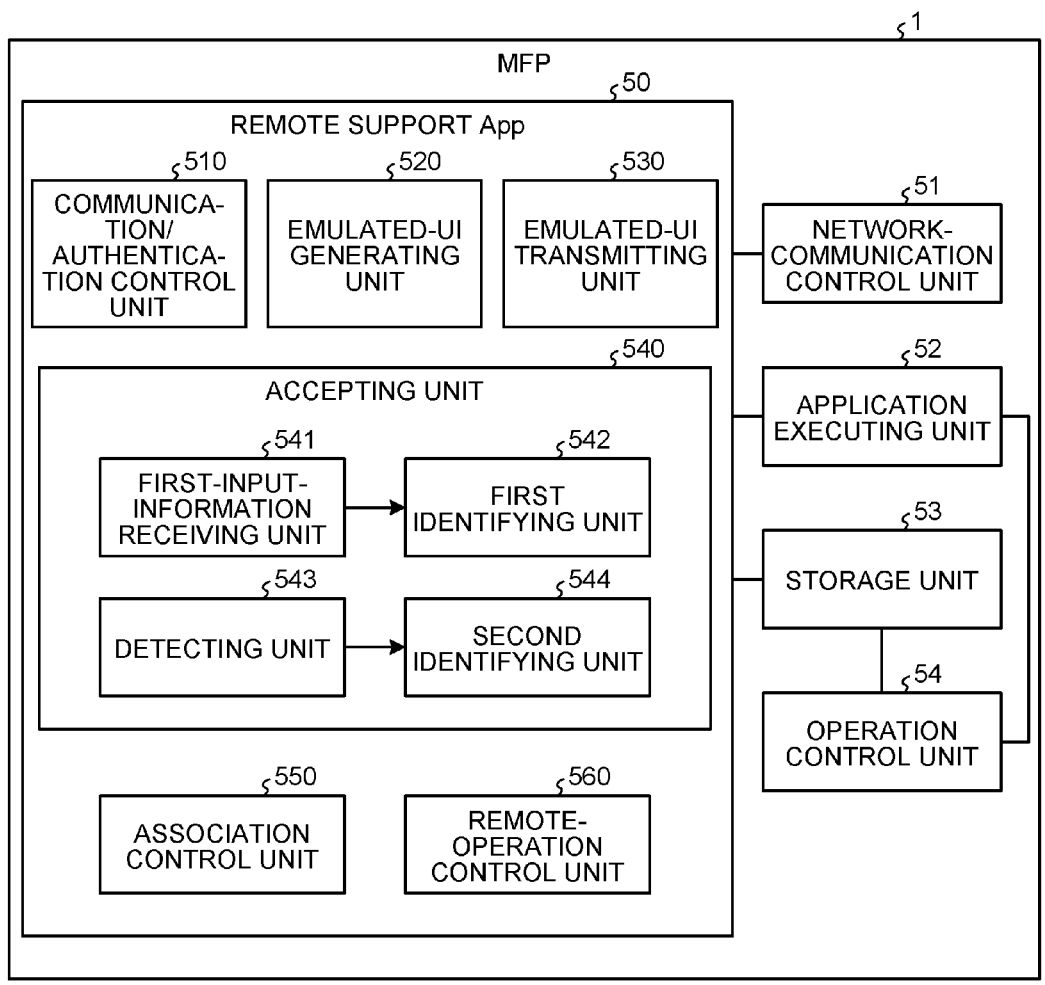
FIG. 6 is a diagram illustrating an example of functions included in the MFP.

Functions included in the MFP 1 are described below. FIG. 6 is a diagram illustrating an example of the functions included in the MFP 1. Although FIG. 6 mainly illustrates functions related to the present invention for convenience of description, functions included in the MFP 1 are not limited thereto. As illustrated in FIG. 6, the MFP 1 includes functions (a communication/authentication control unit 510, an emulated-UI generating unit 520, an emulated-UI transmitting unit 530, an accepting unit 540, an association control unit 550, and a remote-operation control unit 560) provided by the remote support App for providing remote support, which is the mode where the MFP 1 and the PC 2 are mutually connected via the network 3 and the MFP 1 can accept an operation from the PC 2, a network-communication control unit 51, an application executing unit 52, a storage unit 53, and an operation control unit 54.

Referring to the example illustrated in FIG. 6, the functions provided by the above-described remote support App 50 include the communication/authentication control unit 510, the emulated-UI generating unit 520, the emulated-UI transmitting unit 530, the accepting unit 540, the association control unit 550, and the remote-operation control unit 560.

The communication/authentication control unit 510 transmits the above-described connection request to the PC 2 in accordance with an instruction from a user (hereinafter, sometimes referred to as "first user") of the MFP 1. In the first embodiment, when the first user performs an operation for starting remote support on the MFP 1, the communication/authentication control unit 510 performs control of generating the above-described connection request and transmitting the request to the PC 2. When a request for the above-described detailed function information is received from the PC 2, the communication/authentication control unit 510 performs control of reading out detailed function information indicating details of the functions included in the MFP 1 from the ROM 12 or the like and transmitting the read-out detailed function information to the PC 2. When connection is permitted by the PC 2, the communication/authentication control unit 510 performs control for connecting between the MFP 1 and the PC 2 in cooperation with the communication/authentication control unit 401 of the PC 2. Terminating the connection between the MFP 1 and the PC 2 (i.e., terminating the remote support) may be performed in such a manner that the communication/authentication control unit 510 of the MFP 1 performs control of terminating the connection between the MFP 1 and the PC 2 in accordance with an instruction from the first user or, alternatively, in such a manner that the communication/authentication control unit 401 of the PC 2 performs control of terminating the connection between the PC 2 and the MFP 1 in accordance with an instruction from the second user.

The emulated-UI generating unit 520 generates an emulated UI in response to a request from the PC 2 connected to the MFP 1. The emulated-UI transmitting unit 530 performs control of transmitting the emulated UI generated by the emulated-UI generating unit 520 to the PC 2.

The accepting unit 540 accepts operations. In the first embodiment, the accepting unit 540 has a function of accepting an operation from the PC 2 connected to the MFP 1 via the network 3 and a function of accepting an operation (i.e., an operation directly performed by the first user) performed on the operating unit 20 of the MFP 1. As illustrated in FIG. 6, the accepting unit 540 includes, as the function of accepting an operation from the PC 2 during remote support, a first-input-information receiving unit 541 and a first identifying unit 542. The accepting unit 540 further includes, as the function of accepting an operation performed on (the operating panel 27 of) the operating unit 20, a detecting unit 543 and a second identifying unit 544.

The first-input-information receiving unit 541 receives first input information indicating an input entered into the emulated UI from the PC 2 where the emulated UI is displayed. The first identifying unit 542 identifies an operation based on the first input information received by the first-input-information receiving unit 541. As described above, in the first embodiment, first input information contains at least first starting point information indicating a starting point of a position specified by the second user on the emulated UI, time information indicating time corresponding to the first starting point information, first endpoint information indicating an endpoint of the position specified by the second user on the emulated UI, and time information indicating time corresponding to the first endpoint information. The first identifying unit 542 can identify (determine) which one of the following operations is performed by the second user on the emulated UI based on the above-described information contained in the first input information. The operations are: click, long press, drag (an operation of moving a cursor (pointed position) while pressing a button of a mouse), and flick (an operation of moving the cursor in a flicking motion while pressing the mouse button).

Various known techniques can be used by the first identifying unit 542 as a method for determining (i.e., a method for identifying) the operation. Furthermore, the first identifying unit 542 can determine, in addition to a type of the operation, information (pertinent information) pertaining to the operation. Examples of the pertinent information include a direction of the operation (e.g., a direction in which a flick operation is performed) and an amount of the operation (e.g., duration of a long press operation) based on the above-described information contained in the first input information. In the first embodiment, the accepting unit 540 can implement the function of accepting an operation (i.e., an operation from the PC 2) based on the above-described first input information by virtue of including the first-input-information receiving unit 541 and the first identifying unit 542.

The detecting unit 543 detects an input entered into a screen displayed on the operating panel 27 (an example of "display unit") of the operating unit 20. In the first embodiment, the detecting unit 543 is configured, but not limited, to detect a position pressed (touched) by the first user (user of the MFP 1) on a screen displayed on the operating panel 27 as input information when a desired position on the screen displayed on the operating panel 27 is pressed by the first user with his/her finger, a pointing device, or the like. The second identifying unit 544 identifies an operation based on second input information indicating the input detected by the detecting unit 543.

In the first embodiment, the second input information described above contains, but is not limited to, at least second starting point information indicating a starting point (in this example, a position where the first user starts touching the screen) of a position specified by the first user on a screen displayed on the operating panel 27, time information indicating time corresponding to the second starting point information, second endpoint information indicating an endpoint (in this example, a position where the first user stops touching the screen or, put another way, position where the first user's finger or a pointing device is released from the screen) of the position specified by the first user on the screen displayed on the operating panel 27, and time information indicating time corresponding to the second endpoint information. The second identifying unit 544 can identify (determine) which one of click, long press, drag, and flick operations is performed by the first user on the screen displayed on the operating panel 27 based on the above-described information contained in the second input information.

Various known techniques can be used by the second identifying unit 544 as a method for determining (i.e., a method for identifying) the operation. Furthermore, the second identifying unit 544 can determine, in addition to a type of the operation, information (pertinent information) pertaining to the operation. Examples of the pertinent information include a direction of the operation (e.g., a direction in which a flick operation is performed) and an amount of the operation (e.g., duration of a long press operation) based on the above-described information contained in the second input information. In the first embodiment, the accepting unit 540 can implement the function of accepting an operation (i.e., an operation performed on the operating panel 27) based on the above-described second input information by virtue of including the detecting unit 543 and the second identifying unit 544. In short, the accepting unit 540 has the function of accepting an operation based on the above-described first input information or an operation based on the above-described second input information.

The association control unit 550 performs control of associating operation information indicating the operation accepted by the accepting unit 540 with an image of a region, which corresponds to the operation accepted by the accepting unit 540, on the screen displayed on the operating panel 27 (an example of "display unit") into an associated set and storing the associated set in the storage unit 53. In the first embodiment, the association control unit 550 performs control of associating operation information indicating an operation identified by the first identifying unit 542 with an image of a region, which corresponds to a region where the operation is performed on the emulated UI, on the screen displayed on the operating panel 27 into an associated set and storing the associated set in the storage unit 53. Furthermore, in the first embodiment, the association control unit 550 performs control of associating operation information indicating an operation identified by the second identifying unit 544 with an image of a region corresponding to a region where the operation is performed on the screen displayed on the operating panel 27 into an associated set and storing the associated set in the storage unit 53.

More specifically, for each period from when remote support is started to when the remote support ends, the association control unit 550 performs control of storing association information presenting, in chronological order, associated sets of operation information and an image in the storage unit 53. The operation information is either operation information indicating an operation identified by the first identifying unit 542 or operation information indicating an operation identified by the second identifying unit 544. The image is either an image of a region, which corresponds to a region where the operation identified by the first identifying unit 542 is performed on the emulated UI, on the screen displayed on the operating panel 27, or an image of a region where the operation identified by the second identifying unit 544 is performed on the screen displayed on the operating panel 27.

As described above, in the first embodiment, first input information received from the PC 2 during remote support contains at least first starting point information indicating a starting point of a position specified by the second user on the emulated UI, time information indicating time corresponding to the first starting point information, first endpoint information indicating an endpoint of the position specified by the second user on the emulated UI, and time information indicating time corresponding to the first endpoint information. In the first embodiment, during remote support, the association control unit 550 performs control of associating operation information indicating an operation identified by the first identifying unit 542 with an image of a region, which is on the screen displayed on the operating panel 27, having a predetermined shape whose center is at a position corresponding to the first starting point information contained in the first input information, based on which the operation is identified by the first identifying unit 542, into an associated set and storing the associated set in the storage unit 53.

More specifically, during remote support, each time an operation (i.e., an operation performed on the PC 2) is identified by the first identifying unit 542, the association control unit 550 extracts an image of a rectangular (an example of the predetermined shape) region, which is on the screen displayed on the operating panel 27 and whose center is at a position corresponding to first starting point information contained in first input information, based on which the operation is identified, and stores the image in a file. The association control unit 550 associates an image ID, by which the file is identified, with operation information indicating the operation identified by the first identifying unit 542 into an associated set and stores the associated set in association information associated with the remote support (i.e., associated with a period from when the remote support is started to when the remote support ends) in chronological order (i.e., in the order in which operations are performed). Although the image ID is associated with the operation information in this example, what is to be associated is not limited thereto. For example, a configuration, in which operation information is associated with a hash value, by which an image can be identified, may alternatively be employed.

As described above, in the first embodiment, second input information indicating an input (i.e., an input entered into the operating panel 27) detected by the detecting unit 543 during remote support contains at least second starting point information indicating a starting point of a position specified by the first user on a screen displayed on the operating panel 27, time information indicating time corresponding to the second starting point information, second endpoint information indicating an endpoint of the position specified by the first user on the screen displayed on the operating panel 27, and time information indicating time corresponding to the second endpoint information. In the first embodiment, during remote support, the association control unit 550 performs control of associating operation information indicating an operation identified by the second identifying unit 544 and an image of a region, which is on the screen displayed on the operating panel 27, having a predetermined shape whose center is at a position indicated by the second starting point information contained in the second input information, based on which the operation is identified by the second identifying unit 544, into an associated set, and storing the associated set in the storage unit 53.

More specifically, during remote support, each time an operation (i.e., an operation performed on the MFP 1) is identified by the second identifying unit 544, the association control unit 550 extracts an image of a rectangular (an example of the predetermined shape) region, which is on the screen displayed on the operating panel 27 and whose center is at a position indicated by second starting point information contained in second input information, based on which the operation is identified, and storing the image in a file. The association control unit 550 associates an image ID, by which the file is identified, with operation information indicating the identified operation into an associated set and stores the associated set in association information associated with the remote support in chronological order.

FIG. 7 is a diagram illustrating an example of association information associated with a certain period (i.e., a period from when one cycle of remote support is started until when the one cycle ends). Referring to the example of FIG. 7, the association information is information, in which operation information is associated with an image ID for each ordinal number of order information indicating order of operations performed within the associated period. However, the association information is not limited thereto. Referring to the example illustrated in FIG. 7, the operation information contains type information indicating a type of the operation and pertinent information indicating information (e.g., information indicating a direction of the operation and an amount of the operation) pertaining to the operation. However, the operation information is not limited thereto. The pertinent information can be generated by the above-described first identifying unit 542 or the second identifying unit 544, for example.

Figure 8:
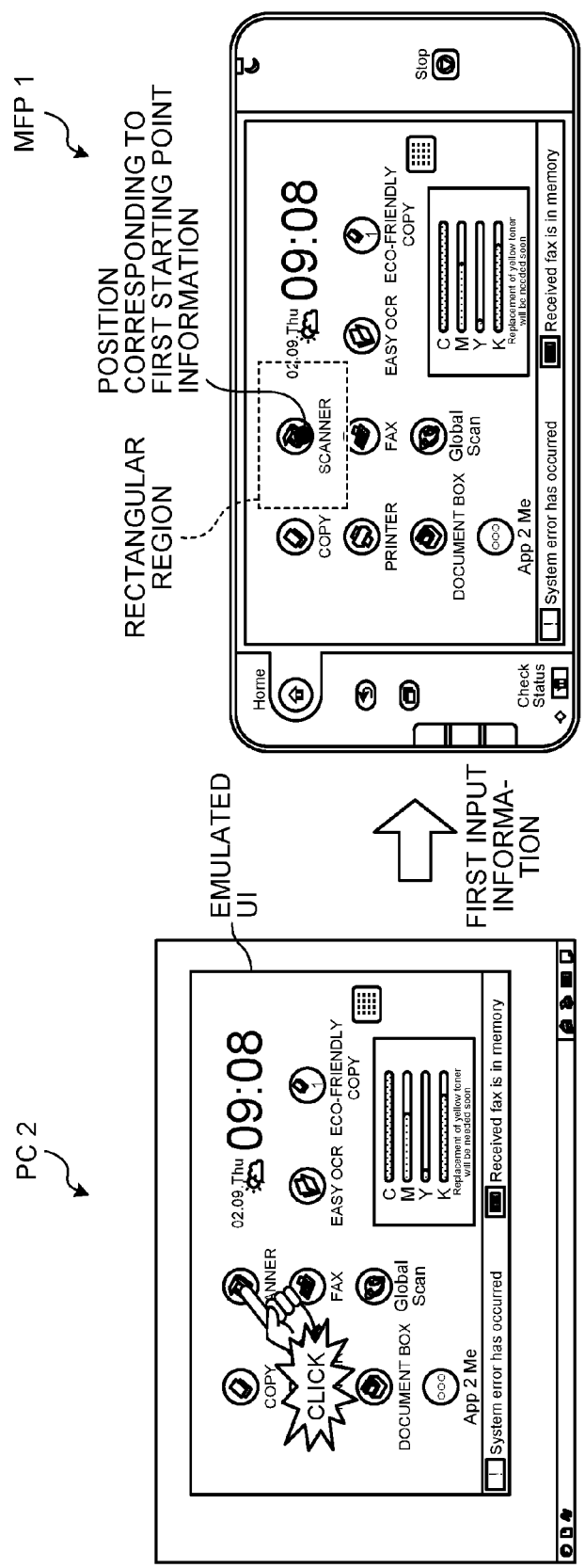
FIG. 8 is an explanatory diagram of an example of operation to be performed when a click operation is performed by a second user during remote support.

An example, in which the operation at order information "6" is performed in the period, with which the association information illustrated in FIG. 7 is associated, is described below. When the second user moves a cursor to a desired position (in the example illustrated in FIG. 8, to the icon "Scanner") by operating a mouse on an emulated UI displayed on the display unit 305 of the PC 2 and performs a click operation of pressing a button of the mouse and releases the button quickly as illustrated in FIG. 8, the remote-operation control unit 404 of the PC 2 transmits first input information, which depends on the click operation, to the MFP 1. The first input information contains at least first starting point information indicating a position where the second user starts pressing the mouse button on the emulated UI, time information indicating time corresponding to the first starting point information, first endpoint information indicating a position where the second user releases his/her finger from the mouse button, and time information indicating time corresponding to the first endpoint information. When the first-input-information receiving unit 541 of the MFP 1 receives the above-described first input information from the PC 2, the first identifying unit 542 of the MFP 1 can identify the "click" operation based on the received first input information. The association control unit 550 then extracts an image of a rectangular region, which is on a screen displayed on the operating panel 27 and whose center is at a position corresponding to the first starting point information contained in the first input information, based on which the "click" operation is identified by the first identifying unit 542, and stores the image in a file. The association control unit 550 associates order information (in this example, order information "6") obtained by adding "1" to immediately-preceding order information (in this example, order information "5") with operation information indicating "click" and an image ID (in this example, "Fff-.png"), by which the file is identified, into an associated set and stores the associated set in the association information.

Further description is given below with reference back to FIG. 6. During remote support, the remote-operation control unit 560 performs control of causing the application executing unit 52 to execute an application program (hereinafter, "application"), which depends on the operation accepted by the accepting unit 540.

The network-communication control unit 51 controls communications carried out via the network 3. More specifically, the network-communication control unit 51 transmits and receives data to and from the PC 2 via the network 3. The application executing unit 52 executes an application under control of the remote-operation control unit 560 or the operation control unit 54, which is described later. The storage unit 53 stores, for each period from when one cycle of remote support is started until when the one cycle ends, the above-described association information associated with the period. Accordingly, in this example, the storage unit 53 stores therein a plurality of sets of the association information associated with a plurality of periods in a one-to-one correspondence.

The operation control unit 54 reads out each image associated with one, which is selected by the first user, of the one or more sets of association information stored in the storage unit 53 in chronological order. If the screen displayed on the operating panel 27 contains a region corresponding to the read-out image, the operation control unit 54 performs automatic operation control (hereinafter, sometimes referred to as "script control") of performing an operation indicated by operation information associated with the read-out image. In the first embodiment, if the screen displayed on the operating panel 27 contains a region corresponding to the read-out image, the operation control unit 54 performs automatic operation control of performing an operation indicated by operation information associated with the read-out image while setting a starting point of the operation to the center of the region.

Figure 9:
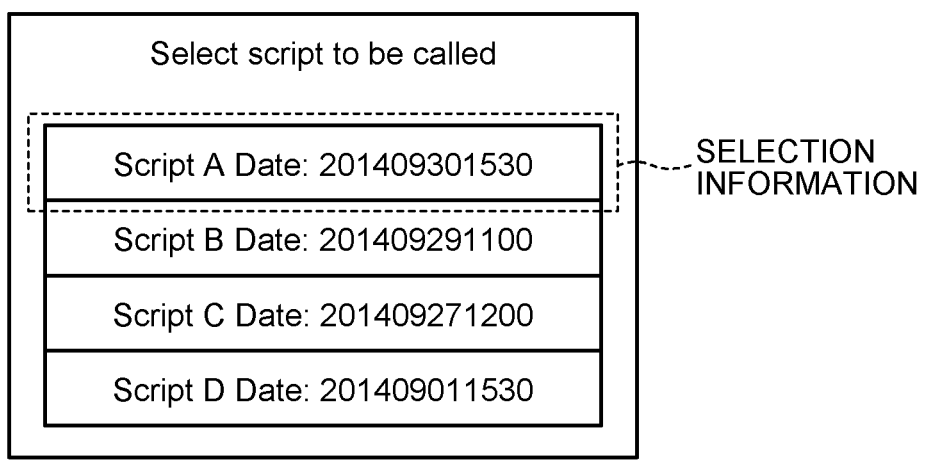
FIG. 9 is a diagram illustrating an example of a selection screen.
Figure 10:
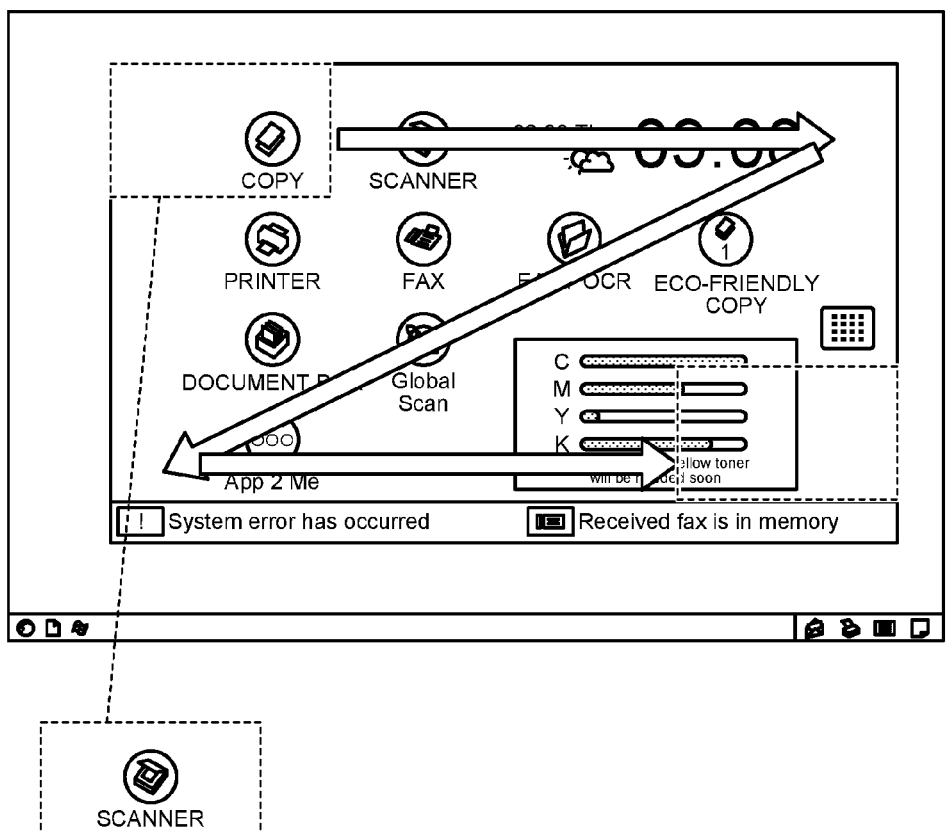
FIG. 10 is an explanatory diagram for describing an example of a method for detecting, among images displayed on an operating unit, an image associated in association information in script control.

In the first embodiment, the operation control unit 54 performs, as preprocessing for the script control, control of displaying such a selection screen as that illustrated in FIG. 9 for selecting one or more (in this example, four) sets of the association information stored in the storage unit 53 on the operating panel 27. For example, the operation control unit 54 may be configured to perform control of displaying the selection screen when triggered by acceptance of a selection-screen display request from the first user. Four units of selection information, each unit being a combination of information ("script A" to "script D"), by which association information is identified, and a period associated with the association information, are displayed on the selection screen of FIG. 9. In this example, the first user performs an operation of selecting any one unit of the selection information (in this example, an operation of touching any one unit of the selection information) on the selection screen. The operation control unit 54 executes the script control using association information associated with the selected selection information triggered by the selection of the selection information made by the first user.

The script control is described below by way of example, in which association information associated with selection information selected by the first user is configured as illustrated in FIG. 7. The operation control unit 54 reads out an image stored in a file identified by an image ID (in this example, "Aaa.png") associated with order information "1" in the association information of FIG. 7 first. The operation control unit 54 raster scans a screen displayed on the operating panel 27 from the top-left corner of the screen to detect whether or not the screen contains a region corresponding to the image stored in the file identified by "Aaa.png". If the screen displayed on the operating panel 27 contains a region corresponding to the image stored in the file identified by "Aaa.png", the operation control unit 54 performs control of performing the "click" operation associated with the image ID "Aaa.png" in the association information of FIG. 7 while setting a starting point of the operation to the center of the region. The operation control unit 54 performs control of causing the application executing unit 52 to execute an application, which depends on the operation performed in the script control. The operation control unit 54 repeatedly performs control similar to that described above by reading out each image associated in the association information of FIG. 7 in chronological order. When the control (the control similar to that described above) using an image stored in a file identified by an image ID (in this example, "Fff.png") associated with the order information "6" is complete, the script control ends.

Figure 11:
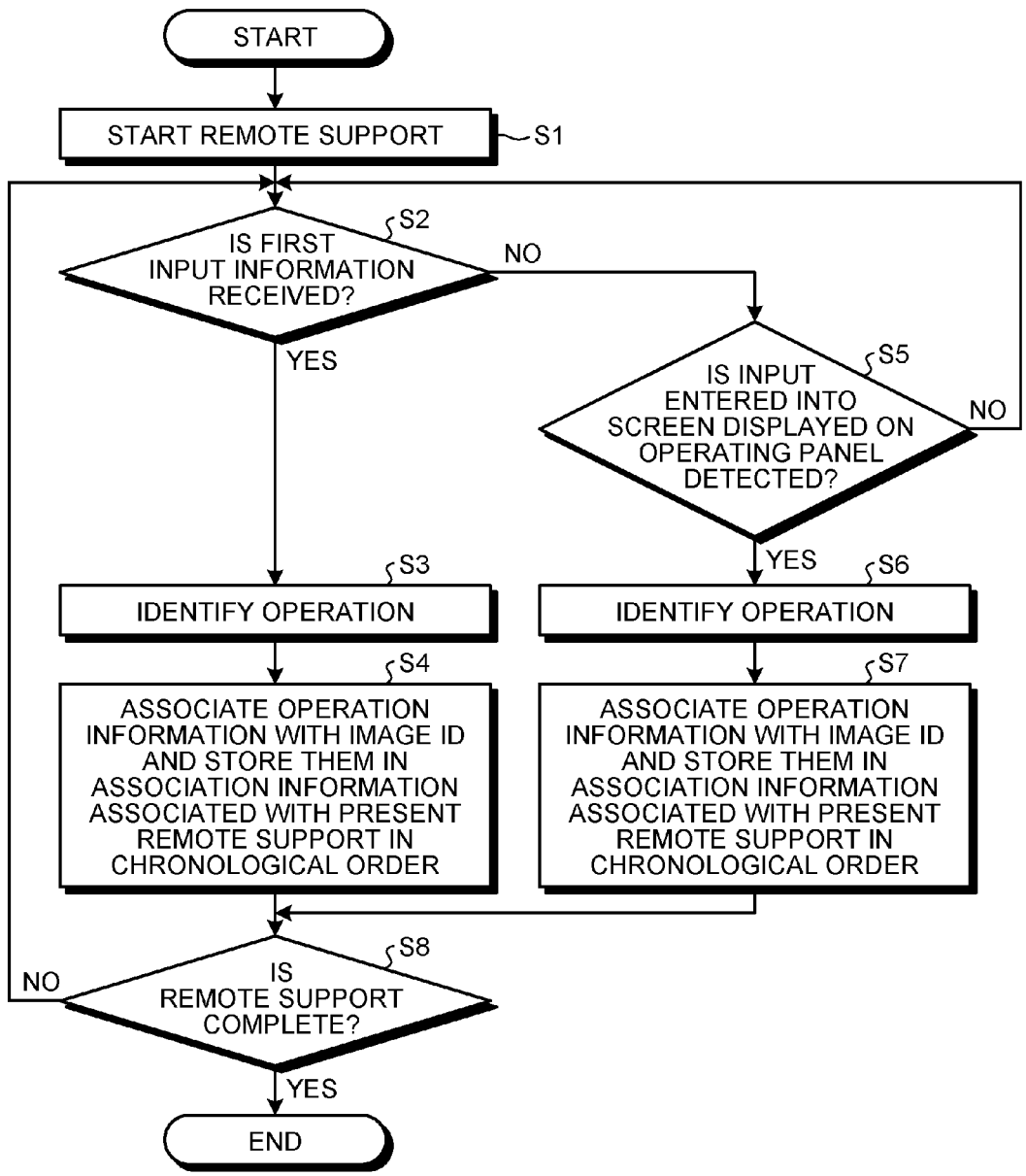
FIG. 11 is a flowchart illustrating an example of processing performed by a remote support App.

FIG. 11 is a flowchart illustrating an example of processing performed by the above-described remote support App 50. The communication/authentication control unit 510 performs control for starting remote support (step S1). As described above, in the first embodiment, when an operation for starting remote support is performed by the first user on the MFP 1, the communication/authentication control unit 510 performs control of generating the above-described connection request and transmitting the request to the PC 2. When a request for the above-described detailed function information is issued from the PC 2, the communication/authentication control unit 510 performs control of reading out detailed function information indicating details of the functions included in the MFP 1 from the ROM 12 or the like and transmitting the read-out detailed function information to the PC 2. When the PC 2 permits connection, the communication/authentication control unit 510 performs control for connecting between the MFP 1 and the PC 2 in cooperation with the communication/authentication control unit 401 of the PC 2.

If the first-input-information receiving unit 541 of the accepting unit 540 receives first input information (Yes at step S2), the first identifying unit 542 identifies an operation based on the first input information received at S2 (step S3). The association control unit 550 then stores an image of a rectangular region, which is on a screen displayed on the operating panel 27 and whose center is at a position corresponding to first starting point information contained in the first input information, based on which the operation is identified at step S3, in a file. The association control unit 550 associates operation information indicating the operation identified at S3 with an image ID, by which the file is identified, into an associated set and stores the associated set in association information associated with the remote support (the remote support started at step S1) in chronological order (step S4).

On the other hand, if the first-input-information receiving unit 541 does not receive first input information (No at step S2), but the detecting unit 543 of the accepting unit 540 detects an input entered into the screen displayed on the operating panel 27 of the operating unit 20 (Yes at step S5), the second identifying unit 544 identifies an operation based on second input information indicating the input detected at step S5 (step S6). The association control unit 550 then stores an image of a rectangular region, which is on the screen displayed on the operating panel 27 and whose center is at a position corresponding to second starting point information contained in the second input information, based on which the operation is identified at step S6, in a file. The association control unit 550 associates operation information indicating the operation identified at step S6 with an image ID, by which the file is identified, into an associated set and stores the associated set in the association information associated with the remote support (the remote support started at step S1) in chronological order (step S7).

If the remote support is not complete after step S4 or step S7 (No at step S8), step S2 and the following steps are repeated. If the remote support is complete (Yes at step S8), processing ends.

As described above, the first embodiment can advantageously achieve reduction in amount of data involved in replicating an operation. This is achieved by performing control of associating operation information indicating an operation accepted by the accepting unit 540 with an image of a region, which is associated with the operation accepted by the accepting unit 540, on a screen displayed on the operating panel 27 into an associated set and storing the associated set in the storage unit 53.

More specifically, as described above, for each period from when one cycle of remote support is started to when the one cycle ends, the control of storing association information presenting one or more associated sets of operation information and an image in chronological order in the storage unit 53 is performed. The operation information is either operation information indicating an operation (i.e., an operation performed on the PC 2) identified by the first identifying unit 542 or operation information indicating an operation (i.e., an operation performed on the operating panel 27) identified by the second identifying unit 544. The image is either an image of a region, which corresponds to a region where the operation identified by the first identifying unit 542 is performed on the emulated UI, on the screen displayed on the operating panel 27 or an image of a region where the operation identified by the second identifying unit 544 is performed on the screen displayed on the operating panel 27. The script control of reading out each image associated with one, which is selected by the first user, of the one or more sets of association information stored in the storage unit 53 in chronological order and, if the screen displayed on the operating panel 27 contains a region corresponding to the read-out image, performing an operation indicated by operation information associated with the read-out image is performed. Thus, the operation can be replicated with an amount of data smaller than that of movie data and/or audio data.

Second Embodiment

A second embodiment is described below. Description about elements, operations, and the like common between the first and second embodiments is omitted. In the second embodiment, if the screen displayed on the operating panel 27 contains a region whose difference relative to the image associated (i.e., contained) in the association information is equal to or smaller than a threshold, the operation control unit 54 determines that the screen displayed on the operating panel 27 contains a region corresponding to the image associated in the association information.

In the above-described script control, if the screen displayed on the operating panel 27 is determined to contain a region corresponding to the image associated in the association information only when a condition that there is a perfect match between images is met, the following problem can arise, for example. That is, if an image around an icon or button (e.g., a background image) on the screen displayed on the operating panel 27 should be changed between when the association information is recorded and when the script control is executed, a problem that the above-described condition is not met and therefore the script control cannot move to the next step can arise.

By contrast, in the second embodiment, if the screen displayed on the operating panel 27 contains a region whose difference relative to an image associated in the association information is equal to or smaller than a threshold, it is determined that the screen displayed on the operating panel 27 contains a region corresponding to the image associated in the association information. Accordingly, a problem that the script control is prevented from moving to the next step by a minor change in image can be avoided. The above-described threshold can be set as desired depending on design requirements and the like. Alternatively, for example, the inverse number of the difference can be used as an evaluation value for evaluating similarity between the images. The evaluation value may be used such that, if the evaluation value is equal to or larger than a predetermined value, it is determined that the screen displayed on the operating panel 27 contains a region corresponding to the image associated in the association information. In short, if the screen displayed on the operating panel 27 contains a region whose difference relative to the image associated in the association information is equal to or smaller than a threshold, the operation control unit 54 can determine that the screen displayed on the operating panel 27 contains a region corresponding to the image associated in the association information.

Third Embodiment

Figure 12:
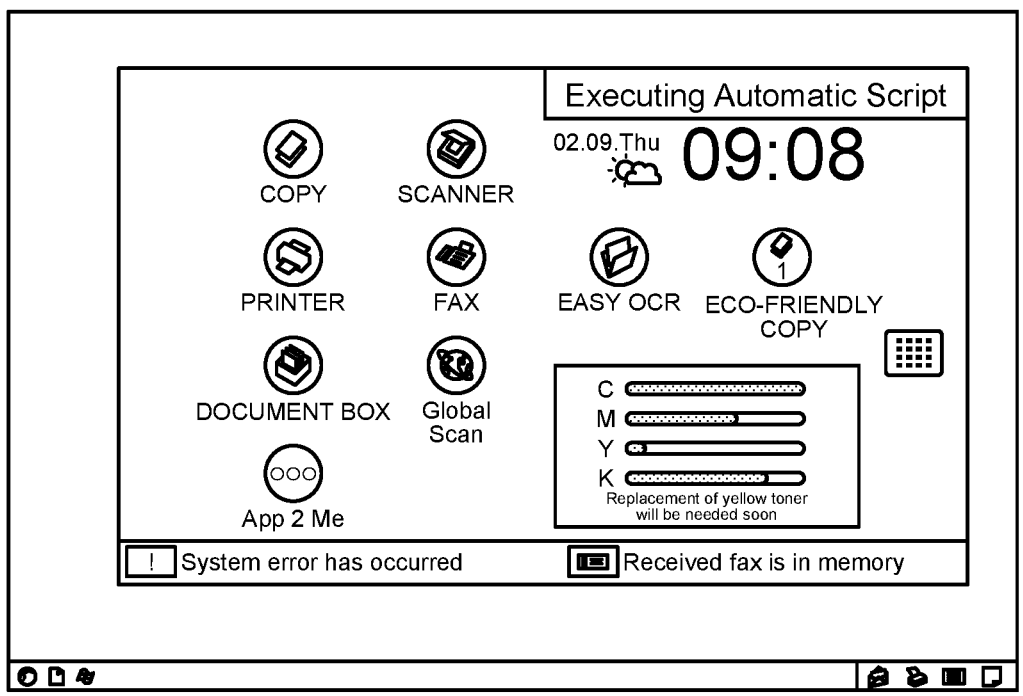
FIG. 12 is a diagram illustrating an example of a message indicating that script control is being executed.

A third embodiment is described below. Description about elements, operations, and the like common between the first and third embodiments is omitted. In the third embodiment, when performing the above-described script control (automatic operation control), the operation control unit 54 performs control of displaying information indicating that script control is being executed on the operating panel 27. For example, as illustrated in FIG. 12, a message indicating that script control is being executed can be displayed on the operating panel 27. This display notifies the first user (user of the MFP 1) that script control is being executed. Accordingly, an undesirable situation that the first user performs an operation on the operating panel 27 without noticing that script control is being executed can be avoided.

Fourth Embodiment

Figure 13:
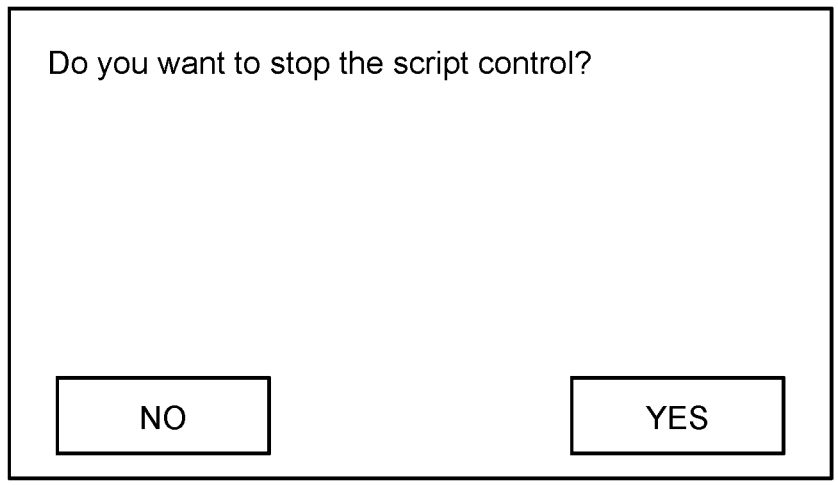
FIG. 13 is a diagram illustrating an example of an instruction receiving screen.

A fourth embodiment is described below. Description about elements, operations, and the like common between the first and fourth embodiments is omitted. In the fourth embodiment, when an instruction to stop the above-described script control (automatic operation control) is accepted, the operation control unit 54 stops the script control. For example, the operation control unit 54 can be configured to perform control of displaying such an instruction receiving screen as that illustrated in FIG. 13 for accepting an instruction as to whether or not to stop script control if, in a condition where the message indicating that script control is being executed is displayed on the operating panel 27 (stated otherwise, in a condition where script control is being executed) as described in the third embodiment, clicking "OK" button for the message is accepted. However, an event that triggers displaying the instruction receiving screen of FIG. 13 is not limited to the clicking "OK" button for the message. If an instruction instructing that the script control be stopped is accepted through the instruction receiving screen of FIG. 13 (in the example of FIG. 13, if "YES" button is clicked), the operation control unit 54 stops the script control being executed even if the script control is not complete yet.

Fifth Embodiment

A fifth embodiment is described below. Description about elements, operations, and the like common between the first and fifth embodiments is omitted. In the fifth embodiment, if a region corresponding to the image associated in the association information is not detected on the screen displayed on the operating panel 27 within a fixed time period, the operation control unit 54 performs control of displaying information indicating that the script control (automatic operation control) has failed on the operating panel 27.

Figure 14:
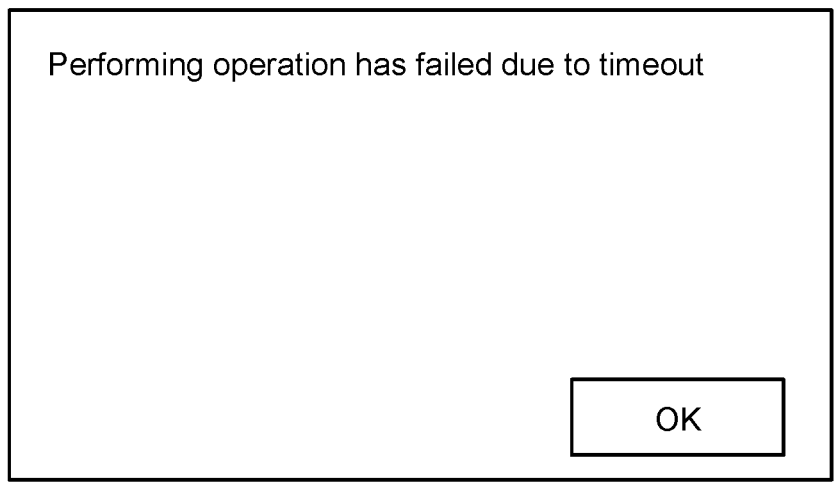
FIG. 14 is a diagram illustrating an example of a message indicating that performing an operation has failed due to timeout.

As described above, the operation control unit 54 performs control in the following manner when executing the script control. The operation control unit 54 reads out each image associated in association information selected by the first user in chronological order and raster-scans the screen displayed on the operating panel 27 from the top-left corner of the screen, thereby detecting whether or not a region corresponding to the read-out image is contained. The operation control unit 54 may perform control of, if a region corresponding to the read-out image is not detected within the fixed time period, displaying a message (an example of information indicating failure of script control) indicating that performing the operation has failed due to timeout on the operating panel 27 as illustrated in FIG. 14.

Sixth Embodiment

A sixth embodiment is described below. Description about elements, operations, and the like common between the first and sixth embodiments is omitted. In the sixth embodiment, for each period from when remote support is started to when the remote support ends, the association control unit 550 performs control of storing association information presenting associated sets of operation information, an image, and displayed-information identification information in chronological order in the storage unit 53. The operation information indicates an operation accepted by the accepting unit 540. The image is an image of a region, which corresponds to the operation indicated by the operation information, on the screen displayed on a display unit. The displayed-information identification information is for identification of a piece of displayed information responded to the operation indicated by the operation information. More specifically, the association control unit 550 performs control of storing association information presenting associated sets of operation information, an image, and a button ID in chronological order in the storage unit 53. The operation information is either an operation information indicating an operation identified by the first identifying unit 542 or operation information indicating an operation identified by the second identifying unit 544. The image is either an image of a region, which corresponds to a region where the operation identified by the first identifying unit 542 is performed on the emulated UI, on the screen displayed on the operating panel 27 (an example of the display unit), or an image of a region where the operation identified by the second identifying unit 544 is performed on the screen displayed on the operating panel 27. The button ID (an example of the displayed-information identification information) is either a button ID for identification of a button (an example of the piece of displayed information) responded to the operation identified by the first identifying unit 542 or a button ID for identification of a button responded to the operation identified by the second identifying unit 544.

In the sixth embodiment, during remote support, each time an operation (i.e., an operation performed on the PC 2)

is identified by the first identifying unit 542, the association control unit 550 extracts an image of a rectangular (an example of the predetermined shape) region, which is on the screen displayed on the operating panel 27 and whose center is at a position corresponding to first starting point information contained in first input information, based on which the operation is identified, and stores the image in a file. The association control unit 550 associates an image ID, by which the file is identified, operation information indicating the operation identified by the first identifying unit 542, and a button ID, by which one button responded to the operation identified by the first identifying unit 542 is identified among a plurality of buttons contained in the screen displayed on the operating panel 27, into an associated set and stores the associated set in association information associated with the remote support in chronological order (i.e., in the order in which operations are performed).

Furthermore, during remote support, each time an operation (i.e., an operation performed on the MFP 1) is identified by the second identifying unit 544, the association control unit 550 extracts an image of a rectangular region, which is on the screen displayed on the operating panel 27 and whose center is at a position indicated by second starting point information contained in second input information, based on which the operation is identified, and stores the image in a file. The association control unit 550 associates an image ID, by which the file is identified, operation information indicating the operation identified by the second identifying unit 544, and a button ID, by which one button responded to the operation identified by the second identifying unit 544 is identified among the plurality of buttons contained in the screen displayed on the operating panel 27, into an associated set and stores the associated set in the association information associated with the remote support in chronological order.

FIG. 15 is a diagram illustrating an example of association information associated with a certain period (which is a period from when one cycle of remote support is started until when the one cycle ends). Referring to the example of FIG. 15, the association information is information, in which operation information, an image ID, and a button ID are associated with each other for each ordinal number of order information indicating order of operations performed within the associated period. However, the association information is not limited thereto. The sixth embodiment is similar in configuration to the above-described embodiments excluding the association information.

In the sixth embodiment, the operation control unit 54 performs control of, if the screen displayed on the operating panel 27 does not contain the image contained in the association information selected by the first user, detecting whether or not a button ID associated with the image is contained in the screen displayed on the operating panel 27 and, if the button ID is contained in the screen displayed on the operating panel 27, performing an operation indicated by operation information associated with the image on a button, which is identified by the button ID among the plurality of buttons contained in the screen displayed on the operating panel 27. The operation indicated by the operation information associated with the image may be performed while setting a starting point of the operation to the center of the button identified by the button ID, for example.

Figure 16:
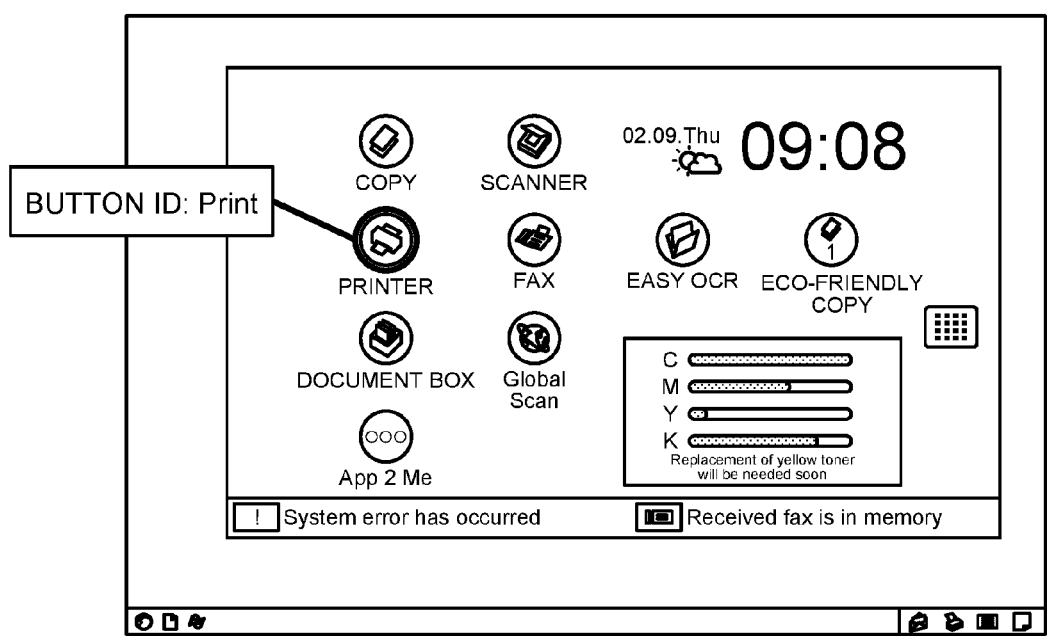
FIG. 16 is an explanatory diagram for describing a situation where a screen displayed on an operation panel contains a button identified by a button ID in the association information.

Operations are described below by way of example, in which the association information selected by the first user is configured as illustrated in FIG. 15 and the operation control unit 54 reads out an image stored in a file identified by an image ID (in this example, "FFF.png") associated with the order information "6" as the image associated in the association information of FIG. 15. The operation control unit 54 raster scans the screen displayed on the operating panel 27 from the top-left corner of the screen to detect whether or not the screen contains the image stored in the file identified by "FFF.png". If the screen displayed on the operating panel 27 does not contain the image stored in the file identified by "FFF.png", the operation control unit 54 detects whether or not the screen displayed on the operating panel contains a button ID "Print" associated with the image ID "FFF.png" in the association information illustrated in FIG. 15. Put another way, the operation control unit 54 detects whether or not the button ID "Print" is described in information, from which the screen displayed on the operating panel 27 is created. If the button ID "Print" is contained in the screen displayed on the operating panel 27 as illustrated in FIG. 16, the operation control unit 54 performs script control of performing the "click" operation associated with the image ID "FFF.png" in the association information of FIG. 15 on a button identified by the button ID. Operations are performed in a similar manner when another image is read out. The sixth embodiment is similar to the other embodiments excluding the above-described operations.

First Modification of Sixth Embodiment

It is assumed in the sixth embodiment described above that the button IDs are predefined in a stage of software development. However, when the button IDs are provided as such, a situation that a button ID(s) is not assigned to some application can occur. To avoid such a situation, the sixth embodiment may be modified such that, if a button ID is not pre-assigned to a button, on which an operation such as clicking is performed, a character string (hereinafter, "key-top character string") for the button is automatically stored in the association information as the button ID.

Assume a situation where, for example, a button ID "Print" for identifying a button (button image) 610 for starting the printer App is pre-assigned to the button 610 but a button ID for identifying a button 620 for starting the scanner App is not pre-assigned to the button 620 as illustrated in FIG. 17. In this example, button information, in which a button ID, a key-top character string, and a process to be performed when the button is clicked are associated with each other, is stored in a storage device, which may be the storage unit 53, for example, for each of the plurality of buttons (button images).

Assume a situation where, for example, the operation accepted by the accepting unit 540 (i.e., the operation identified by the first identifying unit 542 or the second identifying unit 544) when the association information is stored is the "flick" operation, an image of a region corresponding to the "flick" operation is an image identified by the image ID "BBB.png", and a button responded to the "flick" operation is the button 620. The association control unit 550 determines whether or not a button ID is pre-assigned to the button 620 by looking up the button information. In this case, because no button ID is assigned to the button 620, the association control unit 550 registers a key-top character string "Scanner" as the button ID associated with the button 620 in the association information as illustrated in FIG. 18.

In short, the association control unit 550 can, if a button ID is not pre-assigned to a button responded to the operation accepted by the accepting unit 549, set a character string for the button as a button ID, by which the button is identified.

Second Modification of Sixth Embodiment

Figure 19:
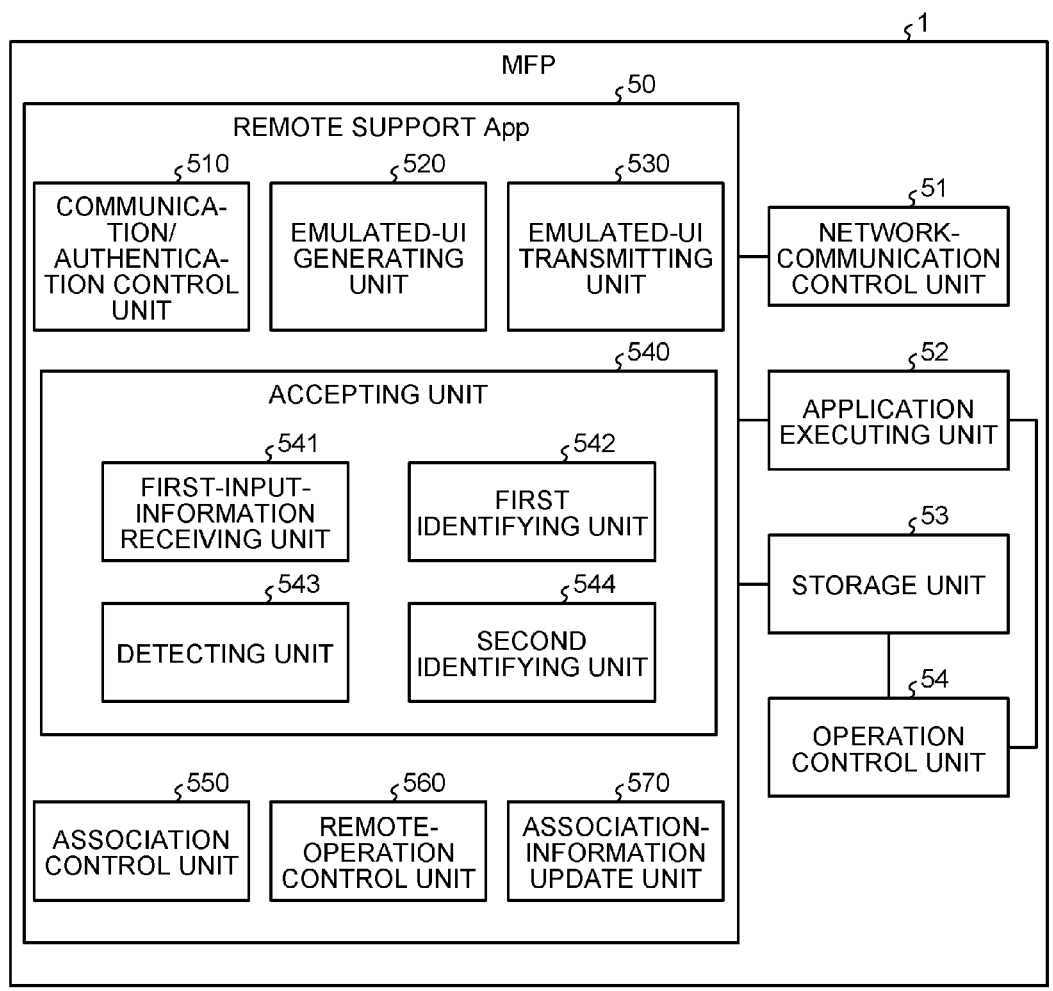
FIG. 19 is a diagram illustrating an example of functions included in the MFP of a second modification.

FIG. 19 is a diagram illustrating an example of functions included in the MFP 1 of a second modification. As illustrated in FIG. 19, functions provided by the remote support App 50 include an association-information update unit 570. The association-information update unit 570 updates, if the screen displayed on the operating panel 27 does not contain the image contained in the association information selected by the first user but contains a button ID associated with the image, the image to an image of a predetermined region including a button identified by the button ID on the screen displayed on the operating panel 27, thereby updating the association information.

Operations are described below by way of example, in which the association information selected by the first user is configured as illustrated in FIG. 15 and the operation control unit 54 reads out the image stored in the file identified by the image ID (in this example, "FFF.png") associated with the order information "6" as the image associated in the association information of FIG. 15. The operation control unit 54 raster scans the screen displayed on the operating panel 27 from the top-left corner of the screen to detect whether or not the screen contains the image stored in the file identified by "FFF.png". If the screen displayed on the operating panel 27 does not contain the image stored in the file identified by "FFF.png", the operation control unit 54 detects whether or not the screen displayed on the operating panel contains the button ID "Print" associated with the image ID "FFF.png" in the association information illustrated in FIG. 15. If the button ID "Print" is contained in the screen displayed on the operating panel 27, the operation control unit 54 performs script control of performing the "click" operation associated with the image ID "FFF.png" in the association information of FIG. 15 on the button identified by the button ID among the plurality of buttons displayed on the screen. At this time, the association-information update unit 570 extracts an image of a predetermined region including the button identified by the button ID "Print" from the screen displayed on the operating panel 27. It is assumed in this example that the file is identified by an image ID "GGG.png". The association-information update unit 570 updates the image ID "FFF.png" associated with the order information "6" in the association information illustrated in FIG. 15 to the image ID "GGG.png", thereby updating the association information (see FIG. 20). This updating allows preventing failure of script control (i.e., failure of the script control resulting from failure in finding either the image or the button ID) while updating images in the association information.

Third Modification of Sixth Embodiment

The sixth embodiment may be modified so as to perform control of storing association information presenting associated sets of operation information, an image, displayed-information identification information, and type information in chronological order in the storage unit 53. The operation information indicates the operation accepted by the accepting unit 540 (i.e., the operation identified by the first identifying unit 542 or the second identifying unit 544). The image is the image of a region, which corresponds to the operation indicated by the operation information, on the screen displayed on the operating panel 27. The displayed-information identification information (in this example, "button ID") is for identification of one piece of displayed information (in this example, "button") responded the operation indicated by the operation information. The type information indicates a type of the one piece of display information.

FIG. 21 is a diagram illustrating an example of association information associated with a certain period (which is a period from when one cycle of remote support is started until when the one cycle ends). Referring to the example illustrated in FIG. 21, the association information is information, in which operation information, an image ID, a button ID, and type information are associated with each other for each ordinal number of order information indicating order of operations performed within the associated period.

Figure 22:
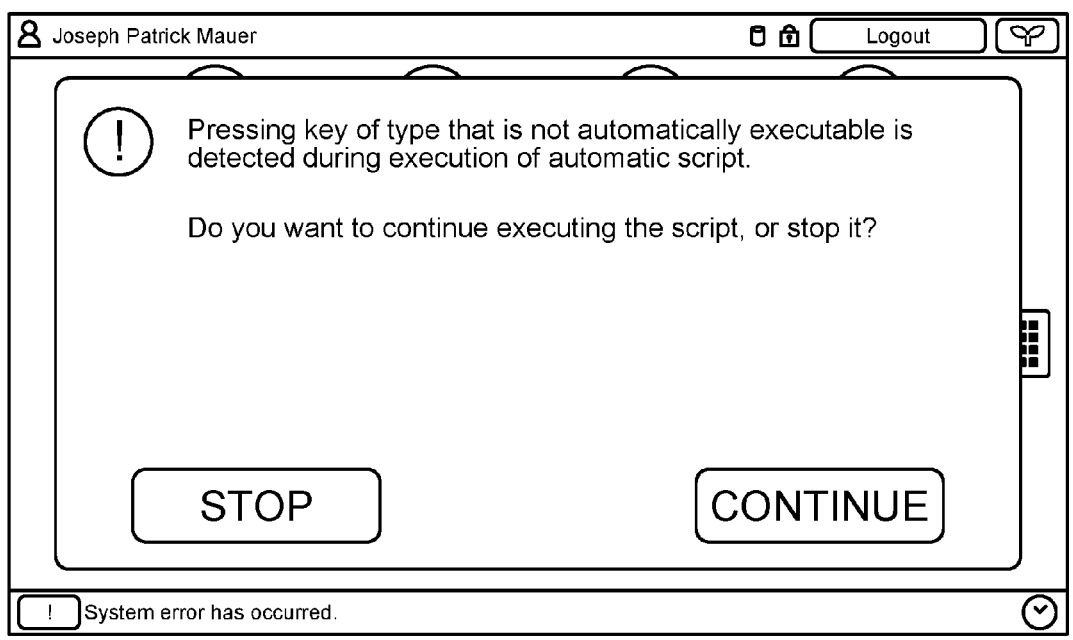
FIG. 22 is a diagram illustrating an example of an instruction receiving screen.

In this example, if the screen displayed on the operating panel 27 contains a button ID contained in the association information selected by the first user described above and if a type indicated by type information associated with the button ID is a specific type, the operation control unit 54 performs control of displaying such an instruction receiving screen as that illustrated in FIG. 22 (in a dialog form, for example), for example, for accepting an instruction as to whether to continue or stop automatic operation control (script control) and waiting for entry of the instruction. The operation control unit 54 executes the script control only when an instruction to continue the script control is accepted. If the instruction to continue the script control is accepted, the operation control unit 54 resumes the script control. On the other hand, if an instruction to stop the script control is accepted, the operation control unit 54 stops the script control immediately.

As used herein, the term "button of a specific type" denotes, but is not limited to, a button for use in performing an irreversible operation, such as a button for performing an operation of changing system settings and a button for instructing to execute a job.

Figure 23:
FIG. 23 is a diagram illustrating an example of a specification screen.

The sixth embodiment may be modified to allow a user to specify a button (i.e., a button of a specific type), for which script control is to be stopped, in advance. For example, a user (the first user) of the MFP 1 can specify a button(s) of the specific type by performing an operation of calling such a specification screen as that illustrated in FIG. 23 for specifying a button(s) of the specific type. In this example, the MFP 1 has a function of determining one or more buttons as the button(s) of the specific type according to an operation accepted through the specification screen. The MFP 1 stores information (specific type information indicating the specific type) indicating the type of the thus-determined button (s) in a storage device such as the storage unit 53. The operation control unit 54 can determine whether or not type information associated with a button ID matches the specific type information by looking up the specific type information, thereby determining whether or not the type indicated by the type information is the specific type. However, the method for the determination is not limited thereto. For example, the MFP 1 may be configured to store correspondence information, in which each type of a plurality of types indicated by type information is associated with information indicating whether or not the type is the specific type, in the storage device in advance. With this configuration, if information associated with type information associated with a button ID indicates that the type indicated by the type information is the specific type, the MFP 1 can determine that the type indicated by the type information is the specific type.

Some script control may include a process of changing settings of the MFP 1. To prevent an undesirable situation that such a process of changing settings is left halfway finished when script control is aborted as described above, the operation control unit 54 may be configured to generate, before executing script control, such information (settings list table) as that illustrated in FIG. 24A indicating a list of current settings of the MFP 1 and store the generated settings list table in a storage device such as the storage unit 53. When the above-described instruction screen is displayed or upon accepting an instruction to stop script control through the instruction screen, the operation control unit 54 generates a settings list table (e.g., such a settings list table as that of FIG. 24B) of current settings and updates the settings list table stored in the storage device with the generated table. The operation control unit 54 may update the settings list table as follows, for example. The operation control unit 54 reads out the settings list table stored in the storage device and compares the read-out settings list table against the settings list table generated when script control is aborted (i.e., compares between the tables before and after execution of the script control), thereby extracting an item(s) whose setting has changed. The operation control unit 54 overwrites a setting value(s) of the extracted item(s) among items in the settings list table of before-script-control with a setting value(s) of the table of after-script-control.

Functions of the above-described units (the communication/authentication control unit 510, the emulated-UI generating unit 520, the emulated-UI transmitting unit 530, the accepting unit 540 (the first-input-information receiving unit 541, the first identifying unit 542, the detecting unit 543, and the second identifying unit 544), the association control unit 550, the remote-operation control unit 560, the network-communication control unit 51, the application executing unit 52, and the operation control unit 54) of the MFP 1 are implemented by the CPU (11 or 21) by executing program instructions stored in a storage device (e.g., the ROM 12, the HDD 14, the ROM 22, or the flash memory 24). However, the implementation is not limited thereto. For example, at least a part of the functions of the above-described units of the MFP 1 may be implemented in dedicated hardware circuitry (e.g., a semiconductor integrated circuit). The above-described storage unit 53 is implemented in a storage device (e.g., the ROM 12, the HDD 14, the ROM 22, or the flash memory 24) included in the MFP 1.

In the embodiments, the main body 10 and the operating unit 20 run on separate operating systems independently of each other. However, the operating form is not limited thereto. For example, a form, in which the main body 10 and the operating unit 20 run on a same operating system, may alternatively be employed.

The program instructions to be executed by the MFP 1 of the embodiments described above may be configured to be provided as being recorded in a non-transitory, computer-readable recording medium such as a CD-ROM, an FD (flexible disk), a CD-R, a DVD (digital versatile disk), or a USB (universal serial bus) as an installable file or an executable file. Alternatively, the program instructions may be configured to be provided or distributed via a network such as the Internet. Further alternatively, the program instructions may be configured to be provided as being pre-installed on a ROM or the like.

According to an aspect of the present invention, an amount of data involved in replicating an operation can be reduced.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing apparatus comprising:
   a display unit;
   a storage unit;
   an accepting unit configured to accept an operation;
   an association control unit configured to perform control of associating operation information indicating the operation accepted by the accepting unit and an image of a region on a screen displayed on the display unit, the region corresponding to the operation accepted by the accepting unit, into an associated set and storing the associated set in the storage unit,
   wherein the accepting unit includes
      a first-input-information receiving unit configured to receive, from a terminal displaying an emulated screen emulating at least the screen displayed on the display unit, first input information indicating an input entered into the emulated screen, and
      a first identifying unit configured to identify an operation based on the first input information received by the first-input-information receiving unit,
   wherein the association control unit is configured to perform control of associating operation information indicating the operation identified by the first identifying unit with an image of a region on the screen displayed on the display unit, the region corresponding to a region where the operation is performed on the emulated screen, into an associated set and storing the associated set in the storage unit, and
   wherein for each period from when remote support from the terminal is started to when the remote support ends, the remote support being a mode where the information processing apparatus can accept an operation, the association control unit is configured to perform control of storing a set of association information in the storage unit, the association information presenting, in chronological order, one or more associated sets of the operation information indicating the operation identified by the first identifying unit and the image of the region on the screen displayed on the display unit, the region corresponding to the region where the operation identified by the first identifying unit being performed on the emulated screen; and
   an operation control unit configured to perform automatic operation control of
      reading out each image associated with one set, the one set being selectable by a first user, the first user being a user of the information processing apparatus, from among the one or more sets of association information stored in the storage unit in chronological order and
      performing, upon the screen displayed on the display unit containing a region corresponding to the read-out image, an operation indicated by operation information associated with the read-out image.

2. The information processing apparatus according to claim 1, wherein
   the first input information contains at least first starting point information indicating a starting point of a position specified by a second user, the second user being a user of the terminal, on the emulated screen, time information indicating time corresponding to the first starting point information, first endpoint information indicating an endpoint of the position specified by the second user on the emulated screen, and time information indicating time corresponding to the first endpoint information, and the association control unit is configured to perform control of associating operation information indicating the operation identified by the first identifying unit with an image of a region on the screen displayed on the display unit, the region having a predetermined shape whose center is at a position corresponding to the first starting point information contained in the first input information, based on which the operation is identified by the first identifying unit, into an associated set and storing the associated set in the storage unit.

3. The information processing apparatus according to claim 2, wherein the operation control unit is configured to perform control of, upon the screen displayed on the display unit containing a region corresponding to the image associated in the association information, performing the operation indicated by the operation information associated with the image while setting a starting point of the operation to center of the region.

4. The information processing apparatus according to claim 1, wherein, upon the screen displayed on the display unit containing a region whose difference relative to the image associated in the association information is equal to or smaller than a threshold, the operation control unit is configured to determine that the screen displayed on the display unit contains a region corresponding to the image associated in the association information.

5. The information processing apparatus according to claim 1, wherein, when performing the automatic operation control, the operation control unit is configured to perform control of displaying information indicating that the automatic operation control is being executed on the display unit.

6. The information processing apparatus according to claim 1, wherein, when an instruction to stop the automatic operation control is accepted, the operation control unit is configured to stop the automatic operation control.

7. The information processing apparatus according to claim 1, wherein, if upon a region corresponding to the image associated in the association information not being detected on the screen displayed on the operating panel within a fixed time period, the operation control unit is configured to perform control of displaying information indicating that the automatic operation control has failed on the display unit.

8. The information processing apparatus according to claim 1, wherein the association control unit is configured to perform control of, for each period from when the remote support is started to when the remote support ends, storing the association information in the storage unit, the association information presenting, in chronological order, one or more associated sets of the operation information indicating the operation accepted by the accepting unit, the image of the region on the screen displayed on the display unit, the region corresponding to the operation indicated by the operation information, and displayed-information identification information for identification of one piece of displayed information responded to the operation indicated by the operation information.

9. The information processing apparatus according to claim 8, wherein the operation control unit is configured to perform control of, upon the screen displayed on the display unit not containing a region corresponding to the image associated in the association information selected by the first user, detecting whether or not the displayed-information identification information associated with the image is contained in the screen displayed on the display unit, and upon the displayed-information identification information being contained in the screen displayed on the display unit, performing the operation indicated by the operation information associated with the image on the one piece of display information identified by the displayed-information identification information among a plurality of pieces of the display information contained in the screen displayed on the display unit.

10. The information processing apparatus according to claim 8, further comprising an association-information update unit configured to, upon the screen displayed on the display unit not containing a region corresponding to the image associated in the association information selected by the first user but containing the displayed-information identification information associated with the image, update the image to an image of a predetermined region on the screen displayed on the display unit, the region including the one piece of display information identified by the displayed-information identification information, thereby updating the association information.

11. The information processing apparatus according to claim 8, wherein the association control unit is configured to perform control of storing the association information in the storage unit, the association information presenting, in chronological order, one or more associated sets of the operation information indicating the operation accepted by the accepting unit, the image of the region on the screen displayed on the display unit, the region corresponding to the operation indicated by the operation information, the displayed-information identification information for identification of the one piece of displayed information responded to the operation indicated by the operation information, and type information indicating a type of the one piece of display information.

12. The information processing apparatus according to claim 11, wherein the operation control unit is configured to perform control of, upon the screen displayed on the display unit containing the displayed-information identification information contained in the association information selected by the first user and upon the type indicated by the type information associated with the displayed-information identification information being a specific type, displaying an instruction receiving screen for accepting an instruction as to whether to continue or stop the automatic operation control and waiting for entry of the instruction.

13. An information processing system comprising:
an information processing apparatus including a display unit; and
a terminal connectable to the information processing apparatus,
the terminal including
an emulated-screen display unit configured to display an emulated screen emulating at least a screen displayed on the display unit and
a first-input-information transmitting unit configured to transmit first input information indicating an input entered into the emulated screen to the information processing apparatus,
the information processing apparatus further including
a storage unit,
an accepting unit configured to accept any one of an operation based on the first input information and an operation based on second input information indicating an input entered into the screen displayed on the display unit, and an association control unit configured to perform control of associating operation information indicating the operation accepted by the accepting unit and an image of a region on the screen displayed on the display unit, the region corresponding to the operation accepted by the accepting unit, into an associated set and storing the associated set in the storage unit, wherein the accepting unit includes
- a first-input-information receiving unit configured to receive, from a terminal displaying an emulated screen emulating at least the screen displayed on the display unit, first input information indicating an input entered into the emulated screen, and
- a first identifying unit configured to identify an operation based on the first input information received by the first-input-information receiving unit, wherein the association control unit is configured to perform control of associating operation information indicating the operation identified by the first identifying unit with an image of a region on the screen displayed on the display unit, the region corresponding to a region where the operation is performed on the emulated screen, into an associated set and storing the associated set in the storage unit, and wherein for each period from when remote support from the terminal is started to when the remote support ends, the remote support being a mode where the information processing apparatus can accept an operation, the association control unit is configured to perform control of storing a set of association information in the storage unit, the association information presenting, in chronological order, one or more associated sets of the operation information indicating the operation identified by the first identifying unit and the image of the region on the screen displayed on the display unit, the region corresponding to the region where the operation identified by the first identifying unit being performed on the emulated screen, and an operation control unit configured to perform automatic operation control of
- reading out each image associated with one set, the one set being selectable by a first user, the first user being a user of the information processing apparatus, from among the one or more sets of association information stored in the storage unit in chronological order and
- performing, upon the screen displayed on the display unit containing a region corresponding to the read-out image, an operation indicated by operation information associated with the read-out image.

14. The information processing system according to claim 13, wherein
the first input information contains at least first starting point information indicating a starting point of a position specified by a second user, the second user being a user of the terminal, on the emulated screen, time information indicating time corresponding to the first starting point information, first endpoint information indicating an endpoint of the position specified by the second user on the emulated screen, and time information indicating time corresponding to the first endpoint information, and the association control unit is configured to perform control of associating operation information indicating the operation identified by the first identifying unit with an image of a region on the screen displayed on the display unit, the region having a shape whose center is at a position corresponding to the first starting point information contained in the first input information, based on which the operation is identified by the first identifying unit, into an associated set and storing the associated set in the storage unit.

15. The information processing system according to claim 13, wherein, upon the screen displayed on the display unit containing a region whose difference relative to the image associated in the association information is equal to or smaller than a threshold, the operation control unit is configured to determine that the screen displayed on the display unit contains a region corresponding to the image associated in the association information.

16. The information processing system according to claim 13, wherein, when performing the automatic operation control, the operation control unit is configured to perform control of displaying information indicating that the automatic operation control is being executed on the display unit.

17. The information processing system according to claim 13, wherein, when an instruction to stop the automatic operation control is accepted, the operation control unit configured to stop the automatic operation control.

18. The information processing system according to claim 13, wherein, upon a region corresponding to the image associated in the association information not being detected on the screen displayed on the operating panel within a fixed time period, the operation control unit is configured to perform control of displaying information indicating that the automatic operation control has failed on the display unit.

19. The information processing system according to claim 13, wherein the association control unit is configured to perform control of, for each period from when the remote support is started to when the remote support ends, storing the association information in the storage unit, the association information presenting, in chronological order, one or more associated sets of the operation information indicating the operation accepted by the accepting unit, the image of the region on the screen displayed on the display unit, the region corresponding to the operation indicated by the operation information, and displayed-information identification information for identification of one piece of displayed information responded to the operation indicated by the operation information.

20. An information processing method comprising:
accepting an operation;
performing association control of associating operation information indicating the operation accepted at the accepting and an image of a region on a screen displayed on a display unit, the region corresponding to the operation accepted at the accepting, into an associated set and storing the associated set in a storage unit,
wherein the accepting includes
receiving, from a terminal displaying an emulated screen emulating at least the screen displayed on the display unit, first input information indicating an input entered into the emulated screen, and
identifying an operation based on the first input information received, wherein the performing includes
- performing control of associating operation information indicating the operation identified with an image of a region on the screen displayed on the display unit, the region corresponding to a region where the operation is performed on the emulated screen, into an associated set and storing the associated set in the storage unit,
- wherein for each period from when remote support from the terminal is started to when the remote support ends, the remote support being a mode where the information processing apparatus can accept an operation, performing control of storing a set of association information in the storage unit, the association information presenting, in chronological order, one or more associated sets of the operation information indicating the operation identified and the image of the region on the screen displayed on the display unit, the region corresponding to the region where the operation identified by the first identifying unit being performed on the emulated screen; and performing automatic operation control of
- reading out each image associated with one set, the one set being selectable by a first user from among the one or more sets of association information stored in the storage unit in chronological order and
- performing, upon the screen displayed on the display unit containing a region corresponding to the read-out image, an operation indicated by operation information associated with the read-out image.

\* \* \* \* \*